United States Patent
Kondo

(10) Patent No.: US 7,679,675 B2
(45) Date of Patent: Mar. 16, 2010

(54) DATA CONVERTING APPARATUS, DATA CONVERTING METHOD, LEARNING APPARATUS, LEANING METHOD, PROGRAM, AND RECORDING MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/482,136

(22) PCT Filed: Apr. 22, 2003

(86) PCT No.: PCT/JP03/05080

§ 371 (c)(1),
(2), (4) Date: Jan. 6, 2005

(87) PCT Pub. No.: WO03/092284

PCT Pub. Date: Nov. 6, 2003

(65) Prior Publication Data

US 2005/0111749 A1 May 26, 2005

(30) Foreign Application Priority Data

Apr. 26, 2002 (JP) .............................. 2002-125628

(51) Int. Cl.
*H04N 7/01* (2006.01)
*H04N 11/20* (2006.01)
*H04N 5/00* (2006.01)
(52) U.S. Cl. ................... 348/448; 348/445; 348/607; 348/458; 382/299
(58) Field of Classification Search ................ 706/21, 706/12, 14, 16, 45, 61, 22; 348/448, 452, 348/458, 441, 445; 282/299
See application file for complete search history.

(56) References Cited

U.S. PATENT DOCUMENTS 5,912,708 A 6/1999 Kondo et al.

(Continued)

FOREIGN PATENT DOCUMENTS

| EP | 0 892 558 | 1/1999 |
| EP | 1 001 371 | 5/2000 |
| JP | 9 74543 | 3/1997 |

(Continued)

OTHER PUBLICATIONS

Edited by Shadan Hojin Nippon Kogyo Gijutsu Shinko Kyokai Neuro Computer Kenkyu Bukai, "Neuro Computing no Kiso Riron", second edition, Kaibundo, Dec. 20, 1991, pp. 13 to 97.

*Primary Examiner*—Brian P Yenke
(74) *Attorney, Agent, or Firm*—Frommer Lawrence & Haug LLP; William S. Frommer; Thomas F. Presson

(57) ABSTRACT

The present invention relates to a data conversion apparatus and a learning device in which an image can be converted into a higher-quality image. A class-tap generating circuit (2) and a predictive-tap generating circuit (3) generate, from an SD image, a predictive tap used for determining the HD pixel of a specified block of an HD image. A classification circuit (4) classifies the HD pixel of the specified block based on the class tap. A coefficient RAM (7) obtains a tap coefficient for the class of the HD pixel of the specified block from tap coefficients obtained by learning the relationship between supervisor data and learner data for each class of at least one class by giving a predetermined constraint condition to the supervisor data. A predictive-computation circuit (8) and a decoding circuit (9) determine the HD pixel of the specified block by using the tap coefficient and the predictive tap.

36 Claims, 14 Drawing Sheets

U.S. PATENT DOCUMENTS

| | | | |
|---|---|---|---|
| 6,134,348 A * | 10/2000 | Nakaya et al. | 382/224 |
| 6,571,142 B1 | 5/2003 | Kondo et al. | |
| 2002/0019892 A1 * | 2/2002 | Kondo et al. | 710/62 |

FOREIGN PATENT DOCUMENTS

| | | |
|---|---|---|
| JP | 9 83961 | 3/1997 |
| JP | 10-136317 | 5/1998 |
| JP | 10-243405 | 9/1998 |
| JP | 2000-148724 | 5/2000 |
| JP | 2001-8056 | 1/2001 |
| JP | 2001-195586 | 7/2001 |
| JP | 2001-236339 | 8/2001 |
| WO | WO 98/30027 | 7/1998 |

\* cited by examiner

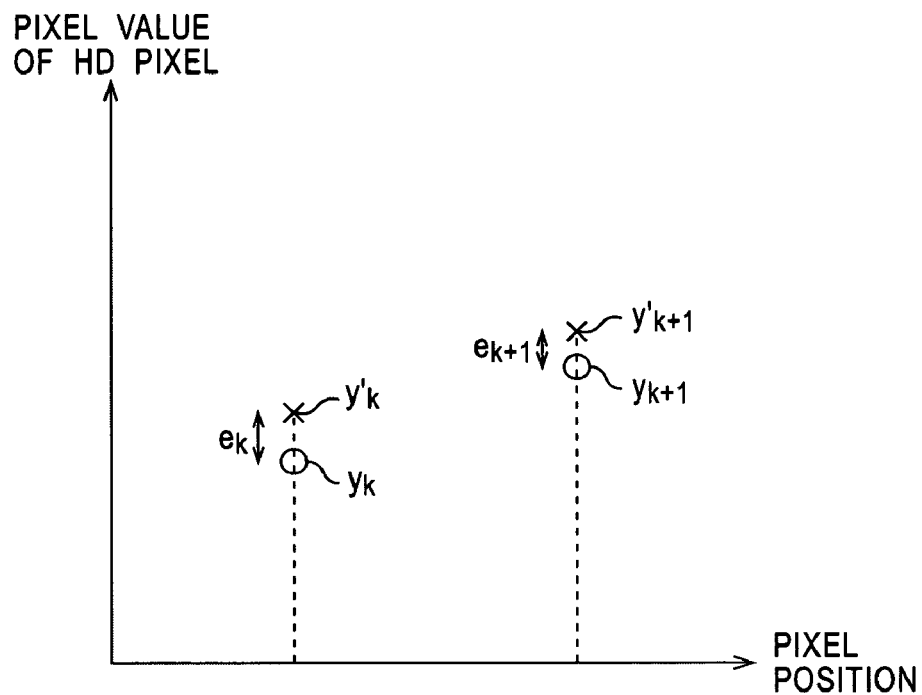
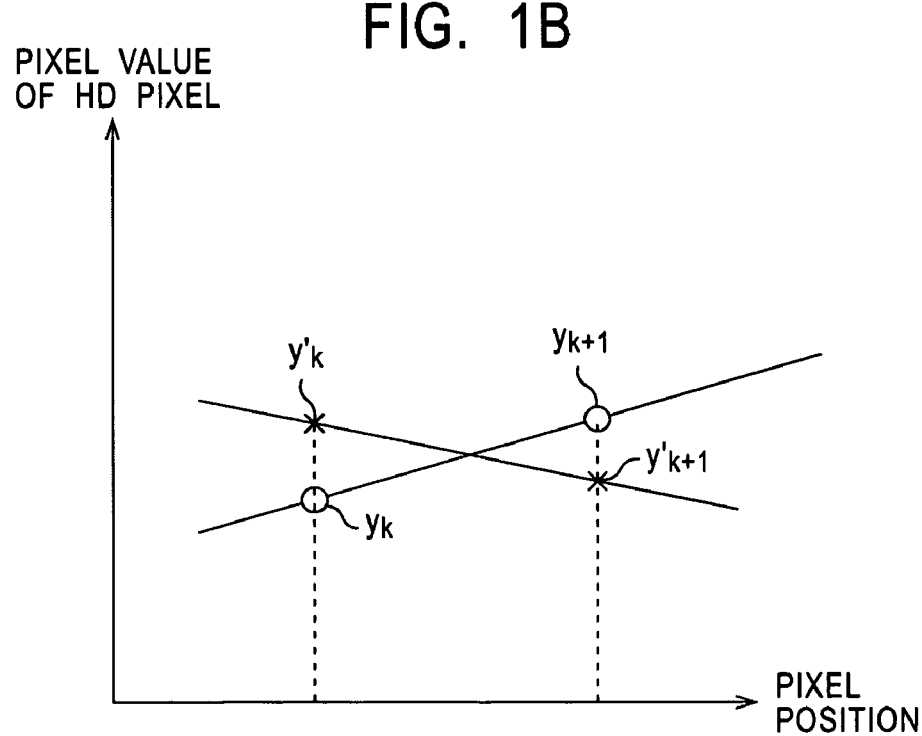

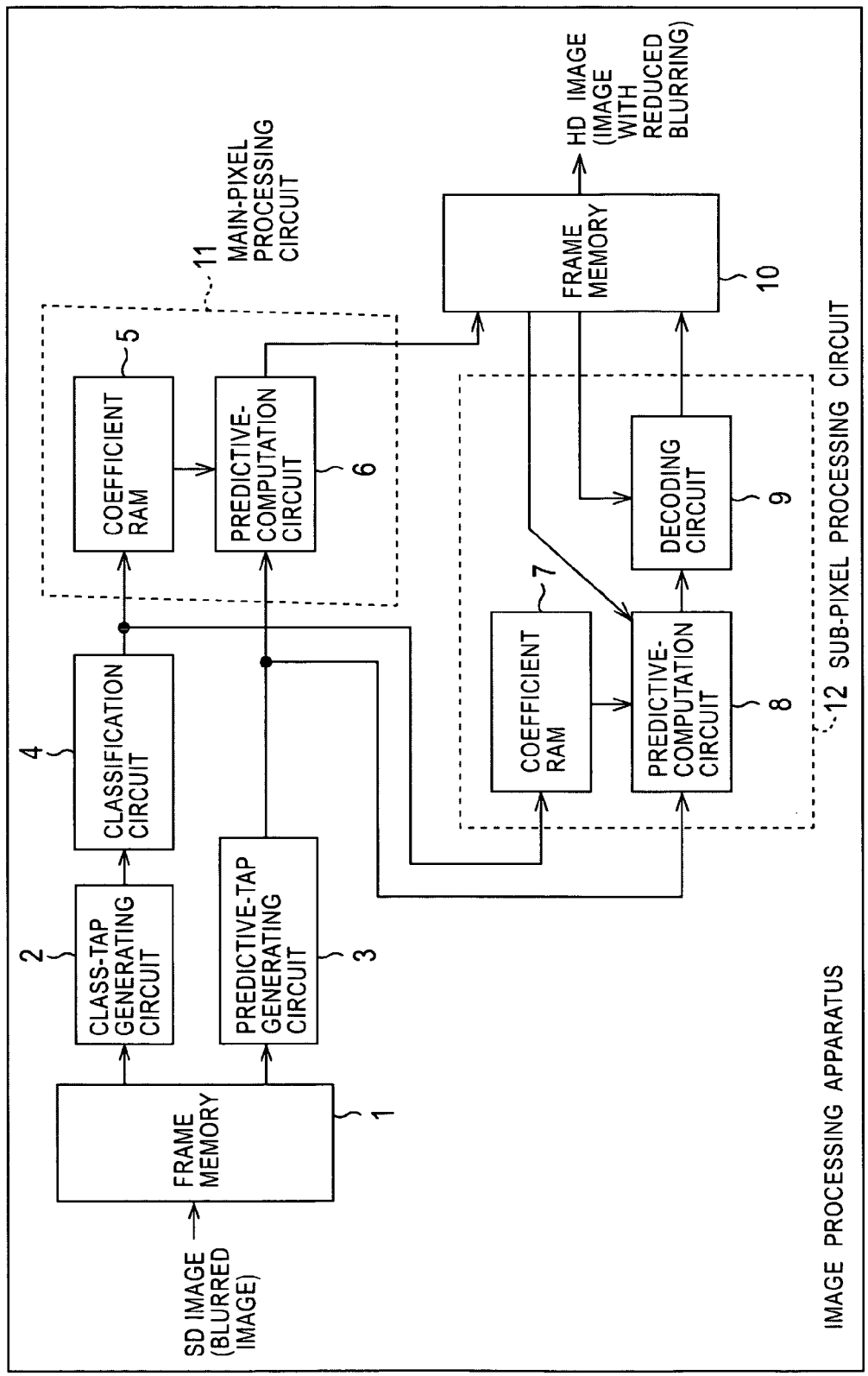

DATA CONVERTING APPARATUS, DATA CONVERTING METHOD, LEARNING APPARATUS, LEANING METHOD, PROGRAM, AND RECORDING MEDIUM

TECHNICAL FIELD

The present invention relates to data conversion apparatuses and methods, learning devices and methods, programs, and recording media. More particularly, the invention relates to a data conversion apparatus and method, a learning device and method, a program, and a recording medium in which image data, for example, can be converted into higher-quality image data.

BACKGROUND ART

The applicant of this application previously proposed classification adaptive processing as data conversion processing for improving the quality of images or performing other types of image conversion.

The classification adaptive processing includes classification processing and adaptive processing: data is classified by classification processing according to the property of the data, and each class of the data is subjected to adaptive processing. The adaptive processing is, for example, as follows.

In the adaptive processing, for example, low-quality or standard-quality image (hereinafter sometimes referred to as an "SD (Standard Definition) image") data is mapped by using predetermined tap coefficients so as to be converted into high-quality image (hereinafter sometimes referred to as an "HD (High Definition) image") data.

It is now assumed that, for example, a linear coupling model is employed as the mapping method using tap coefficients. In this case, the pixel values of pixels y forming HD image data (hereinafter sometimes referred to as "HD pixels") are determined by using tap coefficients and a plurality of pixels forming SD image data (hereinafter sometimes referred to as "SD pixels") extracted as predictive taps for predicting the HD pixels according to the following linear equation (linear coupling).

$$y = \sum_{n=1}^{N} w_n x_n \quad (1)$$

In equation (1), $x_n$ indicates the pixel value of the n-th pixel of the SD image data forming the predictive taps for the HD pixel y, and $w_n$ indicates the n-th tap coefficient to be multiplied with the pixel value of the n-th SD pixel. In equation (1), it is assumed that the predictive taps consist of N SD pixels $x_1$, $x_2, \ldots, x_N$.

The pixel value y of the HD pixel may be determined by equations of higher degrees, such as a quadratic equation, rather than by the linear equation expressed in (1).

When the true value of the pixel value of the k-th sample HD pixel is indicated by $y_k$, and when the predictive value of the true value $y_k$ determined by equation (1) is indicated by $y_k'$, the predictive error $e_k$ is expressed by the following equation.

$$e_k = y_k - y_k' \quad (2)$$

Since the predictive value $y_k'$ in equation (2) is determined by equation (1), equation (1) is substituted into $y_k'$ in equation (2), thereby obtaining the following equation.

$$e_k = y_k - \left( \sum_{n=1}^{N} w_n x_{n,k} \right) \quad (3)$$

In equation (3), $x_{n,k}$ designates the n-th SD pixel forming the predictive taps for the k-th sample HD pixel.

The tap coefficient $w_n$ that sets the predictive error $e_k$ to be 0 in equation (3) is the optimal value for predicting the HD pixel. Generally, however, it is difficult to determine such tap coefficients $w_n$ for all the HD pixels.

Accordingly, as the standard for the optimal tap coefficient $w_n$, the method of least squares, for example, is used. Then, the optimal tap coefficient $w_n$ can be determined by minimizing the sum E of the square errors as the statistical error expressed by the following equation.

$$E = \sum_{k=1}^{K} e_k^2 \quad (4)$$

In equation (4), K indicates the number of set samples of the HD pixel $y_k$ and the SD pixels $x_{1,k}, x_{2,k}, \ldots, x_{N,k}$ forming the predictive taps for the HD pixel $y_k$.

The tap coefficient $w_n$ that minimizes the sum E of the square errors in equation (4) must satisfy the condition that the value determined by partial-differentiating the sum E with the tap coefficient $w_n$ becomes 0, and thus, the following equation must be established.

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \quad (n = 1, 2, \ldots, N) \quad (5)$$

Accordingly, by partial-differentiating equation (3) with the tap coefficient $w_n$, the following equation can be found.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$
$$(k = 1, 2, \ldots, K)$$

The following equation can be found from equations (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) into $e_k$ in equation (7), equation (7) can be expressed by the normal equations expressed by equations (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (8)$$

By preparing a certain number of sets of the HD pixels $y_k$ and the SD pixels $x_{n,k}$, the same number of normal equations (8) as the number of tap coefficients $w_n$ to be determined can be found, and by solving equations (8) (the matrix at the left side next to the tap coefficients $w_n$ in equations (8) must be regular to solve equations (8), the optimal tap coefficients $w_n$ can be determined. In solving equations (8), the sweep-out method (Gauss-Jordan elimination), for example, may be employed.

As described above, by solving equations (8) by setting many HD pixels $y_1, y_2, \ldots, y_K$ to be supervisor data as supervisors for learning tap coefficients and by setting SD pixels $x_{1,k}, x_{2,k}, \ldots, x_{N,k}$ forming the predictive taps for each HD pixel $y_k$ to be learner data as learners for learning the tap coefficients, learning is conducted for determining the optimal tap coefficients $w_n$. By using the optimal tap coefficients $w_n$, SD image data is mapped (converted) onto (into) HD image data by using equation (1). The above-described processing is adaptive processing.

The adaptive processing is different from mere interpolation processing in that components contained not in SD images but in HD images are reproduced. More specifically, only from equation (1), the adaptive processing is similar to the so-called "interpolation processing" using interpolation filters. However, the tap coefficients $w_n$, which correspond to tap coefficients used in the interpolation filters, are determined by learning by using HD image data as supervisor data and SD image data as learner data. Thus, components contained in HD images can be reproduced. Accordingly, it is possible that the adaptive processing serves the function of creating images (creating the resolution).

In learning tap coefficients $w_n$, the combinations of supervisor data y and learner data x can be changed so as to obtain tap coefficients $w_n$ performing various conversions.

If HD image data is used as the supervisor data y, and if SD image data determined by adding noise or blurring to the HD image data is used as the learner data x, tap coefficients $w_n$ for converting an image into an image without noise or blurring can be obtained. If HD image data is used as the supervisor data y, and if SD image data determined by decreasing the resolution of the HD image data is used as the learner data x, tap coefficients $w_n$ for converting an image into an image having improved resolution can be obtained. If image data is used as the supervisor data y, and if DCT (Discrete Cosine Transform) coefficients determined by performing DCT on the image data is used as the learner data x, tap coefficients $w_n$ for converting the DCT coefficients into image data can be obtained.

As described above, in classification adaptive processing, the tap coefficient $w_n$ that minimizes the sum E of the square errors in equation (4) is determined for each class, and equation (1) is calculated by using the tap coefficient $w_n$, thereby converting an SD image into a high-quality HD image. That is, by using the tap coefficients $w_n$ and the predictive taps $x_n$ generated by the SD image, equation (1) is calculated so as to determine HD pixels forming the HD image.

Accordingly, in the classification adaptive processing previously proposed, when focusing on each HD pixel, the predictive value that statistically minimizes the predictive error of each HD pixel with respect to the true value can be determined.

More specifically, it is now assumed, as shown in FIG. 1A, that there are two HD pixels $y_k$ and $y_{k+1}$, which are horizontally, vertically, or obliquely adjacent to each other. In this case, as for the HD pixel $y_k$, the predictive value $y_k'$ that can statistically minimize the predictive error $e_k$ with respect to the true value $y_k$ can be obtained. Similarly, as for the HD pixel $y_{k+1}$ the predictive value $y_{k+1}'$ that can statistically minimize the predictive error $e_{k+1}$ with respect to the true value $y_{k+1}$ can be obtained.

In the classification adaptive processing previously proposed, however, for the two HD pixels $y_k$ and $y_{k+1}$, when the true HD pixel $y_k$ obliquely increases to the right side toward the true HD pixel $y_{k+1}$, as those shown in FIG. 1A, the following result may be sometimes brought about. As shown in FIG. 1B, as for the HD pixel $y_k$, the predictive value $y_k'$, which is greater than the true value, is obtained, and on the other hand, as for the HD pixel $y_{k+1}$ the predictive value $y_{k+1}'$, which is smaller than the true value, is obtained.

In this case, the predictive value $y_k'$ for the HD pixel $y_k$ decreases to the right side toward the predictive value $y_{k+1}'$ for the HD pixel $y_{k+1}$, as shown in FIG. 1B.

As discussed above, if a predictive value decreases to the right side in spite of the fact that a true value increases to the right side, i.e., if a change in the pixel value becomes opposite to a change in the true value, the resulting image quality may be decreased.

DISCLOSURE OF INVENTION

Accordingly, in view of this background, it is an object of the present invention to convert, for example, image data, into higher-quality image data.

A first data conversion apparatus of the present invention includes: class-tap generating means for generating, from first data, a class tap used for classifying a specified sample of second data into a class of at least one class; classification means for classifying the specified sample based on the class tap; predictive-tap generating means for generating, from the first data, a predictive tap for determining the specified sample; tap-coefficient obtaining means for obtaining a tap coefficient for the class of the specified sample from tap coefficients obtained by learning the relationship between supervisor data corresponding to the second data, which serves as a learning supervisor, and learner data corresponding to the first data, which serves as a learner, for each of at least one class by giving a predetermined constraint condition to the supervisor data; and computation means for determining the specified sample by using the predictive tap and the tap coefficient for the class of the specified sample.

A first data conversion method of the present invention includes: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between supervisor data corresponding to the second data, which serves as a learning supervisor, and learner data corresponding to the first data, which serves as a learner, for each of at least one class by giving a predetermined constraint condition to the supervisor data; and a computation step of determining the specified sample by using the predictive tap and the tap coefficient for the class of the specified sample.

A first program of the present invention includes: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between supervisor data corresponding to the second data, which serves as a learning supervisor, and learner data corresponding to the first data, which serves as a learner, for each of at least one class by giving a predetermined constraint condition to the supervisor data; and a computation step of determining the specified sample by using the predictive tap and the tap coefficient for the class of the specified sample.

A first recording medium of the present invention records a program therein, the program including: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between supervisor data corresponding to the second data, which serves as a learning supervisor, and learner data corresponding to the first data, which serves as a learner, for each of at least one class by giving a predetermined constraint condition to the supervisor data; and a computation step of determining the specified sample by using the predictive tap and the tap coefficient for the class of the specified sample.

A first learning device of the present invention includes: class-tap generating means for generating a class tap used for classifying a specified item of supervisor data corresponding to second data, which serves as a supervisor for learning a tap coefficient, into a class of at least one class, from learner data corresponding to first data, which serves as a learner; classification means for classifying the specified item of data based on the class tap; predictive-tap generating means for generating a predictive tap used for determining the specified item of data from the learner data; and learning means for determining, by using the specified item of data and the predictive tap, the tap coefficient for each of at least one class by learning the relationship between the supervisor data and the learner data for each of at least one class by giving a predetermined constraint condition to the supervisor data.

A first learning method of the present invention includes: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning the relationship between the supervisor data and the learner data for each of at least one class by giving a predetermined constraint condition to the supervisor data.

A second program of the present invention includes: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning the relationship between the supervisor data and the learner data for each of at least one class by giving a predetermined constraint condition to the supervisor data.

A second recording medium of the present invention records a program therein, the program including: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning the relationship between the supervisor data and the learner data for each of at least one class by giving a predetermined constraint condition to the supervisor data.

A second data conversion apparatus of the present invention includes: class-tap generating means for generating, from first data, a class tap used for classifying a specified sample of second data into a class of at least one class; classification means for classifying the specified sample based on the class tap; predictive-tap generating means for generating, from the first data, a predictive tap for determining the specified sample; tap-coefficient obtaining means for obtaining a tap coefficient for the class of the specified sample from tap coefficients obtained by learning the relationship between a feature obtained from a plurality of samples of supervisor data corresponding to the second data, which serves as a learning supervisor, and a plurality of samples of learner data corresponding to the first data, which serves as a learner, for each of at least one class; and computation means for determining the specified sample by using the predictive tap and the tap coefficient for the class of the specified sample.

A second data conversion method of the present invention includes: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between a feature obtained from a plurality of samples of supervisor data corresponding to the second data, which serves as a learning supervisor, and a plurality of samples of learner data corresponding to the first data, which serves as a learner, for each of at least one class; and a computation step of determining the specified sample by using the predictive tap and the tap coefficient for the class of the specified sample.

A third program of the present invention includes: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between a feature obtained from a plurality of samples of supervisor data corresponding to the second data, which serves as a learning supervisor, and a plurality of samples of learner data corresponding to the first data, which serves as a learner, for each of at least one class; and a computation step of determining the specified sample by using the predictive tap and the tap coefficient for the class of the specified sample.

A third recording medium of the present invention records a program therein, the program including: a class-tap generating step of generating, from first data, a class tap used for classifying a specified sample of second data into a class of at least one class; a classification step of classifying the specified sample based on the class tap; a predictive-tap generating step of generating, from the first data, a predictive tap for determining the specified sample; a tap-coefficient obtaining step of obtaining a tap coefficient for the class of the specified sample from tap coefficients obtained by learning the relationship between a feature obtained from a plurality of samples of supervisor data corresponding to the second data, which serves as a learning supervisor, and a plurality of samples of learner data corresponding to the first data, which serves as a learner, for each of at least one class; and a computation step of determining the specified sample by using the predictive tap and the tap coefficient for the class of the specified sample.

A second learning device of the present invention includes: class-tap generating means for generating a class tap used for classifying a specified item of supervisor data corresponding to second data, which serves as a supervisor for learning a tap coefficient, into a class of at least one class, from learner data corresponding to first data, which serves as a learner; classification means for classifying the specified item of data based on the class tap; predictive-tap generating means for generating a predictive tap used for determining the specified item of data from the learner data; and learning means for determining, by using the specified item of data and the predictive tap, the tap coefficient for each of at least one class by learning the relationship between a feature obtained from a plurality of samples of the supervisor data and a plurality of samples of the learner data for each of at least one class.

A second learning method of the present invention includes: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning the relationship between a feature obtained from a plurality of samples of the supervisor data and a plurality of samples of the learner data for each of at least one class.

A fourth program of the present invention includes: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning the relationship between a feature obtained from a plurality of samples of the supervisor data and a plurality of samples of the learner data for each of at least one class.

A fourth recording medium of the present invention records a program therein, the program including: a class-tap generating step of generating a class tap used for classifying a specified item of supervisor data corresponding to second data, which serves as a supervisor for learning a tap coefficient, into a class of at least one class, from learner data corresponding to first data, which serves as a learner; a classification step of classifying the specified item of data based on the class tap; a predictive-tap generating step of generating a predictive tap used for determining the specified item of data from the learner data; and a learning step of determining, by using the specified item of data and the predictive tap, the tap coefficient for each of at least one class by learning a relationship between a feature obtained from a plurality of samples of the supervisor data and a plurality of samples of the learner data for each of at least one class.

According to the first data conversion apparatus, the first data conversion method, the first program, and the first recording medium of the present invention, a class tap used for classifying a specified sample of second data into a class of at least one class, and a predictive tap for determining the specified sample are generated from first data. The specified sample is classified based on the class tap. A tap coefficient for the class of the specified sample is obtained from tap coefficients obtained by learning the relationship between supervisor data corresponding to the second data, which serves as a learning supervisor, and learner data corresponding to the first data, which serves as a learner, for each of at least one class by giving a predetermined constraint condition to the supervisor data. The specified sample is determined by using the predictive tap and the tap coefficient.

According to the first learning device, the first learning method, the second program, and the second recording medium of the present invention, a class tap used for classifying a specified item of supervisor data corresponding to second data, which serves as a supervisor for learning a tap coefficient, into a class of at least one class, and a predictive tap used for determining the specified item of data are generated from learner data corresponding to first data, which serves as a learner, and the specified item of data is classified based on the class tap. By using the specified item of data and the predictive tap, the tap coefficient for each of at least one class is determined by learning the relationship between the supervisor data and the learner data for each of at least one class by giving a predetermined constraint condition to the supervisor data.

According to the second data conversion apparatus, the second data conversion method, the third program, and the third recording medium of the present invention, a class tap used for classifying a specified sample of second data into a class of at least one class, and a predictive tap for determining the specified sample are generated from first data. The specified sample is classified based on the class tap. A tap coefficient for the class of the specified sample is obtained from tap coefficients obtained by learning the relationship between a feature obtained from a plurality of samples of supervisor data corresponding to the second data, which serves as a learning supervisor, and a plurality of samples of learner data corresponding to the first data, which serves as a learner, for each of at least one class. The specified sample is determined by using the predictive tap and the tap coefficient for the class of the specified sample.

According to the second learning device, the second learning method, the fourth program, and the fourth recording medium of the present invention, a class tap used for classifying a specified item of supervisor data corresponding to second data, which serves as a supervisor for learning a tap coefficient, into a class of at least one class, and a predictive tap used for determining the specified item of data are generated from learner data corresponding to first data, which serves as a learner. The specified item of data is classified based on the class tap. By using the specified item of data and the predictive tap, the tap coefficient for each of at least one class is determined by learning the relationship between a feature obtained from a plurality of samples of the supervisor data and a plurality of samples of the learner data for each of at least one class.

BRIEF DESCRIPTION OF THE DRAWINGS

FIG. 1A illustrates a deterioration in the image quality.

FIG. 1B illustrates a deterioration in the image quality.

FIG. 2 is a block diagram illustrating an example of the configuration of a first embodiment of an image processing apparatus to which the present invention is applied.

BEST MODE FOR CARRYING OUT THE INVENTION

Figure 3:
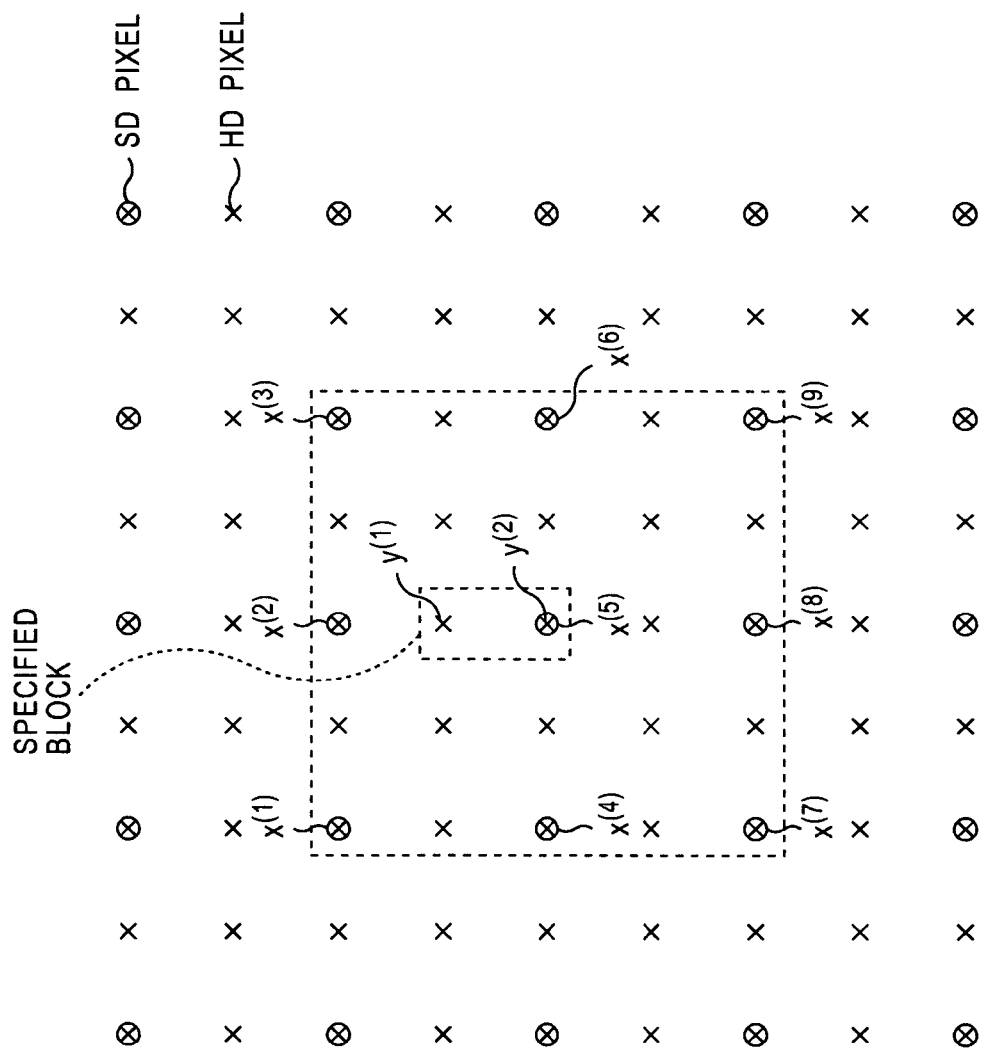
FIG. 3 illustrates a block of HD image data, a class tap, and a predictive tap.

FIG. 2 illustrates an example of the configuration of an embodiment of an image processing apparatus to which the present invention is applied.

In this image processing apparatus, for example, a blurred SD image is input, and classification adaptive processing is performed on the blurred SD image, thereby outputting an HD image in which blurring is sufficiently reduced regardless of the level of blurring of the original SD image.

More specifically, the image processing apparatus includes a frame memory 1, a class-tap generating circuit 2, a predictive-tap generating circuit 3, a classification circuit 4, a frame memory 10, a main-pixel processing circuit 11, and a sub-pixel processing circuit 12. A blurred SD image is input into this image processing apparatus.

The frame memory 1 temporarily stores the SD image input into the image processing apparatus in units of, for example, frames (or fields). In this embodiment, the frame memory 1 is able to store an SD image consisting of a plurality of frames by performing bank switching, thereby making it possible to perform image processing in real time even if the SD image input into the image processing apparatus is a moving picture.

The class-tap generating circuit 2 forms (divides) an HD image (ideal HD image from which blurring is completely eliminated from the SD image) to be determined by the classification adaptive processing into blocks, each block consisting of a plurality of HD pixels (samples), and sequentially specifies each block. The class-tap generating circuit 2 then generates a class tap used for classifying HD pixels forming the specified block from the SD image stored in the frame memory 1, thereby outputting the generated class tap to the classification circuit 4. That is, the class-tap generating circuit 2 extracts, for example, a plurality of SD pixels (samples) positioned spatially or temporally close to the specified block, from the SD image stored in the frame memory 1, and sets the extracted SD pixels as the class tap, thereby outputting the class tap to the classification circuit 4.

More specifically, the class-tap generating circuit 2 divides, for example, as shown in FIG. 3, an HD image into blocks, each block consisting of two vertically adjacent HD pixels, and sequentially specifies each block.

In FIG. 3, ○ represents SD pixels forming the SD image, and x designates HD pixels forming the HD image. In FIG. 3, the number of pixels of the HD image in the vertical and horizontal directions is twice as that of the SD image.

The class-tap generating circuit 2 extracts, as shown in FIG. 3, three-row×three-column SD pixels which are vertically and horizontally close to the specified block from the SD pixels stored in the frame memory 1, and sets the extracted SD pixels as a class tap.

The upper HD pixel and the lower HD pixel of a block divided from an HD image are indicated by "$y^{(1)}$" and "$y^{(2)}$", respectively. Among 3×3 SD pixels forming a class tap, the first-row, the first-column SD pixel, the first-row, second-column SD pixel, the first-row, third-column SD pixel, the second-row, first-column SD pixel, the second-row, second-column SD pixel, the second-row, third-column SD pixel, the third-row, first-column SD pixel, the third-row, second-column SD pixel, and the third-row, third-column SD pixel are indicated by $x^{(1)}$, $x^{(2)}$, $x^{(3)}$, $x^{(4)}$, $x^{(5)}$, $x^{(6)}$, $x^{(7)}$, $x^{(8)}$, and $x^{(9)}$, respectively.

The predictive-tap generating circuit 3 generates, from the SD image stored in the frame memory 1, a predictive tap to be used for determining the predictive value of the HD pixel forming the specified block in a predictive-computation circuit 6, and supplies the generated predictive tap to the predictive-computation circuit 6. That is, the class-tap generating circuit 2 extracts, for example, a plurality of SD pixels positioned spatially or temporally close to the specified block, from the SD image stored in the frame memory 1, and sets the extracted SD pixels as the predictive tap, thereby outputting the predictive tap to the predictive-computation circuit 6.

For the sake of simplicity, for HD pixels forming a specified block, the predictive-tap generating circuit 3 generates, a predictive tap having the same tap structure as that of the class tap, i.e., a predictive tap consisting of 3×3 SD pixels.

However, it is not essential that the SD pixels serving as the predictive tap and the SD pixels serving as the class tap are the same. That is, the predictive tap and the class tap may be independently formed (generated). The tap structure of the class tap or the predictive tap is not restricted to 3×3 SD pixels shown in FIG. 3.

Referring back to FIG. 2, the classification circuit 4 classifies the HD pixels forming the specified block based on the class tap output from the class-tap generating circuit 2, and supplies the class code corresponding to the class of the HD pixels forming the specified block to the main-pixel processing circuit 11 and the sub-pixel processing circuit 12. That is, the classification circuit 4 performs one-bit ADRC (Adaptive Dynamic Range Coding) processing on the class tap output from the class-tap generating circuit 2, and outputs the resulting ADRC code to the main-pixel processing circuit 11 and the sub-pixel processing circuit 12 as the class code.

In K-bit ADRC processing, the maximum value MAX and the minimum value MIN of the pixel values of the SD pixels forming the class tap are detected, and DR=MAX−MIN is set to be the local dynamic range. Then, based on this dynamic range DR, the SD pixels forming the class tap are re-quantized into K bits. That is, the minimum value MIN is subtracted from the pixel value of each SD pixel forming the class tap, and the resulting value is divided (quantized) by $DR/2^K$. Accordingly, when performing one-bit ADRC processing on the class tap, the pixel value of each SD pixel forming the class tap is re-quantized into one bit. In this case, the one-bit pixel values of the individual SD pixels forming the class tap are arranged into a bit stream in a predetermined order, and the bit stream is output as the ADRC code. The classification processing may be performed by another technique, for example, the SD pixels forming the class tap may be considered as vector components, and the vectors may be quantized. In the classification processing, only one class may be used, in which case, the classification circuit 4 outputs fixed class code regardless of which class tap is supplied.

In this embodiment, in the class-tap generating circuit 2, the same class tap is generated for the HD pixels $y^{(1)}$ and $y^{(2)}$ forming the specified block. Accordingly, in the classification circuit 4, the HD pixels $y^{(1)}$ and $y^{(2)}$ forming the specified block are classified into the same class. Thus, in other words, in the classification circuit 4, the HD pixels forming the specified block are classified, and also the specified block is classified.

The class-tap generating circuit 2 may generate class taps having different tap structures for the HD pixels $y^{(1)}$ and $y^{(2)}$ forming the specified block. Similarly, the predictive-tap generating circuit 3 may also generate predictive taps having different tap structures for the HD pixels $y^{(1)}$ and $y^{(2)}$ forming the specified block. If, however, class taps or predictive taps having different tap structures are generated for the HD pixels $y^{(1)}$ and $y^{(2)}$ forming the specified block, it is necessary that class codes or predictive taps determined from the class taps generated for the HD pixels to be found in the main-pixel processing circuit 11 and the sub-pixel processing circuit 12 be supplied to the main-pixel processing circuit 11 and the sub-pixel processing circuit 12.

The frame memory 10 temporarily stores the HD pixels determined in the main-pixel processing circuit 11 and the HD pixels determined in the sub-pixel processing circuit 12, and when the HD pixels, for example, for one frame, are stored, one frame of an HD image consisting of the HD pixels is output. The frame memory 10 is configured similarly to the frame memory 1, and thus, it is able to store the HD pixels supplied from the main-pixel processing circuit 11 and the sub-pixel processing circuit 12 and read the HD pixels from the frame memory 10 at the same time.

The main-pixel processing circuit 11, which is formed of a coefficient RAM (Random Access Memory) 5 and the predictive-computation circuit 6, specifies the main pixel of the HD pixels forming the specified block, determines the predictive value of the main pixel, supplies it to the frame memory 10, and stores it at the address corresponding to the position of the main pixel.

The coefficient RAM 5 stores tap coefficients obtained by learning the relationship between supervisor data, which is HD pixel data serving as a learning supervisor, and learner data, which is SD image data serving as a learner, for each of at least one class. Upon receiving the class code of the HD pixels of the specified block from the classification circuit 4, the coefficient RAM 5 reads the tap coefficient stored at the address corresponding to the class code so as to obtain the tap coefficient of the class of the main pixel of the HD pixels forming the specified block, and supplies the tap coefficient to the predictive-computation circuit 6. Details of the learning method for tap coefficients stored in the coefficient RAM 5 are described below.

The predictive-computation circuit 6 performs product-sum computation expressed by equation (1) by using the tap coefficients $w_1, w_2, \ldots$ for the class of the main pixel supplied from the coefficient RAM 5 and the pixels values $x_1, x_2, \ldots$ of the SD pixels forming the predictive tap supplied from the predictive-tap generating circuit 3 so as to determine the predictive value of the main pixel y. The predictive-computation circuit 6 then supplies the predictive value to the frame memory 10 and stores it therein as the pixel value of the HD pixel with reduced blurring.

In this embodiment, HD pixels forming each block divided from an HD image contain at least one main pixel and pixel other than the main pixel, i.e., a sub pixel. The main pixel is the HD pixel determined by using a tap coefficient obtained by learning the relationship between supervisor data and learner data without giving a constraint condition to the supervisor data. The sub-pixel is the HD pixel determined by using a tap coefficient obtained by learning the relationship between supervisor data and learner data by giving a constraint condition to the supervisor data.

In this embodiment, between the two HD pixels forming the block of the HD image shown in FIG. 3, the upper HD pixel $y^{(1)}$ is the main pixel, and the lower HD pixel $y^{(2)}$ is the sub pixel.

The sub-pixel processing circuit 12, which is formed of a coefficient RAM 7, a predictive-computation circuit 8, and a decoding circuit 9, determines the predictive value of the sub pixel $y^{(2)}$ of the HD pixels forming the specified block, supplies the determined sub pixel to the frame memory 10, and stores it at the address corresponding to the position of the sub pixel.

That is, the coefficient RAM 7 stores tap coefficients obtained by learning the relationship between the supervisor data, which is the HD image data as the supervisor, and the learner data, which is the SD image data as the learner, for each of at least one class by giving a constraint condition to the supervisor data. Then, upon receiving the class code of the specified block from the classification circuit 4, the coefficient RAM 7 reads the tap coefficient stored at the address corresponding to the class code so as to obtain the tap coefficient of the class of the sub pixel of the HD pixels forming the specified block, and supplies the tap coefficient to the predictive-computation circuit 6. As stated above, since the same class tap is generated for the main pixel and the sub pixel of the same block, the class of the main pixel is the same as the class of the sub pixel. Details of the learning method for the tap coefficients stored in the coefficient RAM 7 are described below.

The predictive-computation circuit 8 performs product-sum computation corresponding to equation (1) by using the tap coefficients $\Delta w1, \Delta w2, \ldots$ for the classes of the sub pixels that are supplied from the coefficient RAM 7 and the pixel values of the SD pixels forming the predictive taps x1, x2, ... supplied from the predictive-tap generating circuit 3 so as to determine the predictive value of the difference $\Delta y$ between the sub pixel and the HD pixel stored in the frame memory 10, and supplies the determined difference to the decoding circuit 9. In this embodiment, it is assumed that, for the sub pixel $y^{(2)}$ of the specified block, for example, the difference $\Delta y(=y^{(2)}-y^{(1)})$ between the sub pixel $y^{(2)}$ and the main pixel $y^{(1)}$ of the specified block can be determined in the predictive-computation circuit 8.

The decoding circuit 9 decodes the difference for the sub pixel supplied from the predictive-computation circuit 8 into a sub pixel. More specifically, in this embodiment, as the difference $\Delta y$ for the sub pixel $y^{(2)}$, the difference between the sub pixel $y^{(2)}$ and the main pixel $y^{(1)}$ of the same block is used. Accordingly, the decoding circuit 9 reads the predictive value of the main pixel $y^{(1)}$ of the specified block from the frame memory 10, and adds the main pixel $y^{(1)}$ to the difference $\Delta y$ supplied from the predictive-computation circuit 8, thereby determining the predictive value of the sub pixel $y^{(2)}$ ($=\Delta y + y^{(1)}$). The decoding circuit 9 then supplies the determined sub pixel to the frame memory 10 and stores it therein.

The image conversion processing for converting an SD image into an HD image performed by the image processing apparatus shown in FIG. 2 is described below with reference to the flowchart of FIG. 4.

An SD image (moving picture) to be subjected to image conversion processing is supplied to the frame memory 1 sequentially in units of frames, and the frames of the SD image are sequentially stored in the frame memory 1.

In step S1, the class-tap generating circuit 2 specifies a frame (which is to be stored in the frame memory 10) of an HD image to be determined, and forms the specified frame into blocks, each block consisting of two vertically adjacent HD pixels $y^{(1)}$ and $y^{(2)}$, as discussed above with reference to FIG. 3. The process then proceeds to step S2.

In step S2, the class-tap generating circuit 2 specifies one of the undetermined blocks forming the specified frame, and proceeds to step S3.

In step S3, the class-tap generating circuit 2 and the predictive-tap generating circuit 3 extract a plurality of SD pixels spatially or temporally adjacent to the position of the specified block from the SD image stored in the frame memory 1 so as to generate a class tap and a predictive tap, respectively. Also in step S3, the class-tap generating circuit 2 supplies the class tap of the specified block to the classification circuit 4, and the predictive-tap generating circuit 3 supplies the predictive tap of the specified block to the main-pixel processing circuit 11 and the sub-pixel processing circuit 12. The process then proceeds to step S4.

In step S4, the classification circuit 4 classifies each of the main pixel $y^{(1)}$ and the sub pixel $y^{(2)}$ forming the specified block based on the class tap supplied from the class-tap generating circuit 2, and supplies the class code representing the resulting class for the specified block to the main-pixel processing circuit 11 and the sub-pixel processing circuit 12. The process then proceeds to step S5.

In step S5, the coefficient RAM 5 of the main-pixel processing circuit 11 reads the tap coefficient stored at the address corresponding to the class code supplied from the classification circuit 4 so as to obtain the tap coefficient of the class of the main pixel $y^{(1)}$ forming the specified block, and supplies the tap coefficient to the predictive-computation circuit 6. Also in step S5, the coefficient RAM 7 of the sub-pixel processing circuit 12 reads the tap coefficient stored at the address corresponding to the class code supplied from the classification circuit 4 so as to obtain the tap coefficient of the class of the sub pixel $y^{(2)}$ forming the specified block, and supplies the tap coefficient to the predictive-computation circuit 8.

Thereafter, the process proceeds to step S6 in which the main-pixel processing circuit 11 specifies the main pixel of the specified block, and calculates the predictive value of the specified pixel $y^{(1)}$. More specifically, in step S6, in the main-pixel processing circuit 11, the predictive-computation circuit 6 performs computation expressed by equation (1) by using the predictive tap supplied from the predictive-tap generating circuit 3 and the tap coefficient supplied from the coefficient RAM 5, thereby determining the predictive value of the main pixel $y^{(1)}$, which is the specified pixel. Also in step S6, the predictive-computation circuit 6 supplies the determined main pixel $y^{(1)}$ to the frame memory 10, and stores it at the address corresponding to the position of the main pixel $y^{(1)}$. The process then proceeds to step S7.

In step S7, the sub-pixel processing circuit 12 specifies the sub pixel of the specified block, and calculates the predictive value of the specified pixel $y^{(2)}$. More specifically, in step S7, in the sub-pixel processing circuit 12, the predictive-computation circuit 8 performs product-sum computation (details are given below) corresponding to equation (1) by using the predictive tap supplied from the predictive-tap generating circuit 3 and the tap coefficient supplied from the coefficient RAM 7 so as to determine the predictive value of the difference $\Delta y$ between the sub pixel $y^{(2)}$, which is the specified pixel, and the HD pixel $y^{(1)}$, which is the main pixel, and supplies the difference to the decoding circuit 9. Also in step S7, the decoding circuit 9 adds the main pixel $y^{(1)}$ determined in step S6 and stored in the frame memory 10 to the difference $\Delta y$ supplied from the predictive-computation circuit 8, thereby determining the predictive value of the sub pixel $y^{(2)}$, which is the specified pixel. The decoding circuit 9 then supplies the sub pixel y$^{(2)}$ to the frame memory 10, and stores it at the address corresponding to the position of the sub pixel y$^{(2)}$. The process then proceeds to step S8.

In step S8, the class-tap generating circuit 2 determines whether there is any block that has not been determined as the specified block forming the specified frame. If it is determined that there is such a block, the process returns to step S2, and processing similar to the above-described processing is repeated.

If it is determined that there is no block that has not been determined as the specified block, i.e., that all the HD pixels forming the specified frame are stored in the frame memory 10, the process proceeds to step S9. In step S9, the frame memory 10 reads and outputs the HD image of the specified frame, and the process then proceeds to step S10.

In step S10, the class-tap generating circuit 2 determines whether there is any frame of the HD image to be subsequently determined. If it is determined that there is such a frame, the process returns to step S1 in which the frame is specified, and processing similar to the above-described processing is repeated.

If it is determined in step S10 that there is no frame of the HD image to be subsequently determined, the process is completed.

Figure 5:
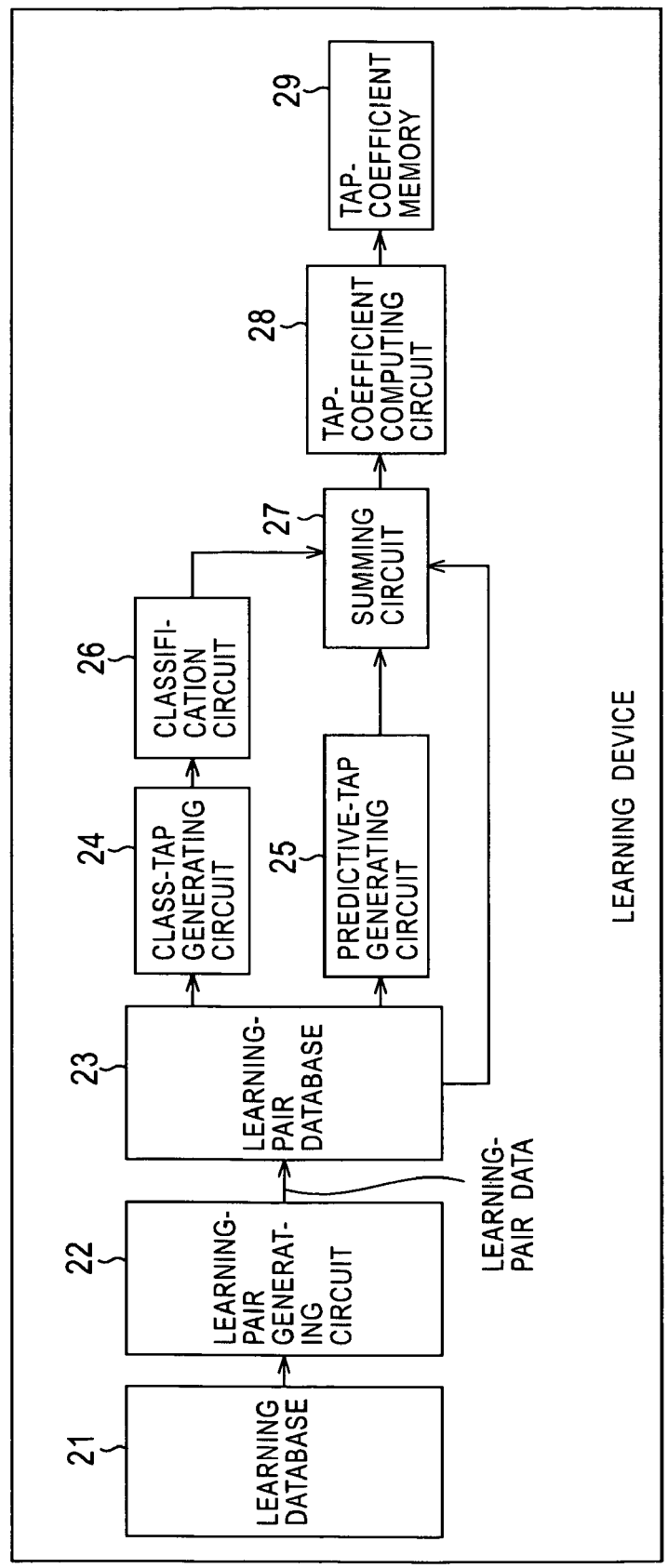
FIG. 5 is a block diagram illustrating an example of the configuration of an embodiment of a learning device for learning tap coefficients to be stored in a coefficient RAM 5.

FIG. 5 illustrates an example of the configuration of an embodiment of a learning device that conducts learning for determining a tap coefficient for each class to be stored in the coefficient RAM 5 shown in FIG. 2.

In a learning database 21, for example, HD image data, as image data for learning tap coefficients is stored.

A learning-pair generating circuit 22 generates learning-pair data as a set of supervisor data and learner data used for learning tap coefficients from the learning image data stored in the learning database 21, and supplies the learning-pair data to a learning-pair database 63.

That is, the learning-pair generating circuit 22 reads the learning image data stored in the learning database 21, and sets the HD image data, which is the learning image data, directly as supervisor data. The HD image obtained in the image processing apparatus shown in FIG. 2 is equivalent to the image quality of the HD image data used as the supervisor data in the learning device shown in FIG. 5.

The learning-pair generating circuit 22 also decreases the image quality of the HD image data as the supervisor data, and more specifically, the learning-pair generating circuit 22 reduces, for example, the number of pixels of the HD image data as the supervisor data, and then filters the HD image data having a reduced number of pixels with a LPF (Low Pass Filter), thereby generating learner data, which is the SD image data, determined by blurring the HD image data as the supervisor data. The SD image data as the learner data must coincide with the image quality of the SD image data to be processed in the image processing apparatus shown in FIG. 2.

The learning-pair generating circuit 22 generates the supervisor data and the corresponding learner data generated from the supervisor data as described above, and supplies a set of the supervisor data and the learner data to the learning-pair database 23 as the learning-pair data.

The learning-pair database 23 temporarily stores the learning-pair data supplied from the learning-pair generating circuit 22 therein.

A class-tap generating circuit 24 forms the HD image, which serves as the supervisor data of the learning-pair data stored in the learning-pair database 23, into the same blocks as those in the class-tap generating circuit 2 shown in FIG. 2, and sequentially specifies each block. The class-tap generating circuit 24 also generates a class tap for each of the main pixel and the sub pixel forming the specified block from the SD image as the learner data of the learning-pair data stored in the learning-pair database 23, and supplies the class tap to a classification circuit 26. The class-tap generating circuit 24 generates a class tap having the same tap structure as that generated by the classification circuit 2 shown in FIG. 2.

A predictive-tap generating circuit 25 generates a predictive tap for each of the main pixel and the sub pixel forming the specified block from the SD image as the learner data of the learning-pair data stored in the learning-pair database 23, and supplies the predictive tap to a summing circuit 27. The predictive-tap generating circuit 25 generates a class tap having the same tap structure as that generated by the predictive-tap generating circuit 3 shown in FIG. 2.

A classification circuit 26, which is configured similarly to the classification circuit 4 shown in FIG. 2, classifies each of the main pixel and the sub pixel forming the specified block based on the class tap supplied from the class-tap generating circuit 24, and supplies the class code representing the class of the specified block to the summing circuit 27.

By using the supervisor data, which is the main pixel of the specified block, of the learning-pair data stored in the learning-pair database 23 and the predictive tap supplied from the predictive-tap generating circuit 25, the summing circuit 27 and a tap-coefficient computing circuit 28 conduct learning for the relationship between the supervisor data and the learner data as the learning-pair data stored in the learning-pair database 23 for each class supplied from the classification circuit 26, thereby determining a tap coefficient for each class.

That is, the summing circuit 27 performs summation in equations (8) for the predictive taps supplied from the predictive-tap generating circuit 25 and the HD pixels serving as the supervisor data, which is the main pixel of the specified block of the learning-pair data stored in the learning-pair database 23 for each class code output from the classification circuit 26.

More specifically, the summing circuit 27 performs calculations corresponding to multiplication $(x_{n,k} x_{n',k})$ of the SD pixels and summation ($\Sigma$) in the matrix at the left side of equations (8) by using the SD pixels $x_{n,k}$ serving as the learner data forming the predictive tap for each class corresponding to the class code supplied from the classification circuit 26.

The summing circuit 27 also performs calculations corresponding to multiplication $(x_{n,k} y_k)$ of the SD pixels $x_{n,k}$ and the HD pixel $y_k$ and summation ($\Sigma$) in the vector at the right side of equations (8) by using the SD pixels $x_{n,k}$ serving as the learner data forming the predictive tap and the HD pixel $y_k$ as the supervisor data, which is the main pixel of the specified block, for each class corresponding to the class code supplied from the classification circuit 26.

When establishing the normal equations expressed in equations (8) for each class by performing the above-described summation by using all the blocks of the HD image as the supervisor data in the learning-pair data stored in the learning-pair database 23, the summing circuit 27 supplies the normal equations to the tap-coefficient computing circuit 28.

Upon receiving the normal equations expressed by equations (8) for each class from the summing circuit 27, the tap-coefficient computing circuit 28 solves the normal equations to determine the tap coefficient for each class, and outputs the tap coefficient.

A tap-coefficient memory 29 stores the tap coefficient for each class supplied from the tap-coefficient computing circuit 28.

Figure 6:
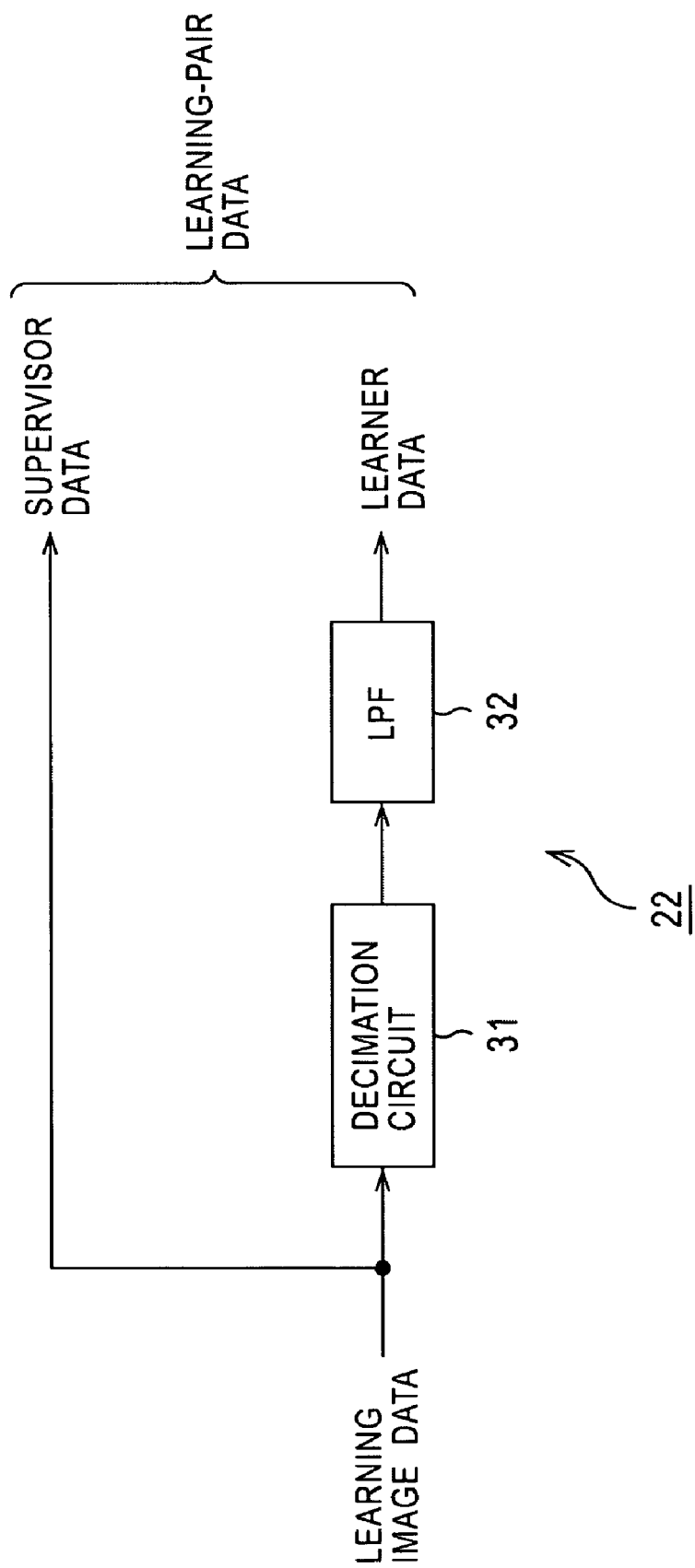
FIG. 6 is a block diagram illustrating an example of the configuration of a learning-pair generating circuit 22.

FIG. 6 illustrates an example of the configuration of the learning-pair generating circuit 22 shown in FIG. 5.

HD image data as the learning image data stored in the learning database 21 (FIG. 5) is supplied to the learning-pair generating circuit 22, and the learning-pair generating circuit 22 outputs the HD image data as the supervisor data.

A decimation circuit 31 reduces the number of pixels of the HD image data as the learning image data, and supplies the resulting SD image data to an LPF 32. As discussed with reference to FIG. 3, in this embodiment, SD image data is converted into HD image data having the number of vertical and horizontal pixels twice as that of the SD image data in the image processing apparatus 2. Accordingly, conversely, in the decimation circuit 31, the number of vertical and horizontal pixels of the HD image data as the learning image data is reduced to one half.

The LPF 32, having predetermined frequency characteristics, filters the SD image data supplied from the decimation circuit 31 so as to obtain the blurred SD image data, and outputs it as the learner data.

The learning-pair generating circuit 22 outputs a set of the supervisor data and the learner data obtained as described above to the learning-pair database 23 (FIG. 5) as the learning-pair data.

Figure 7:
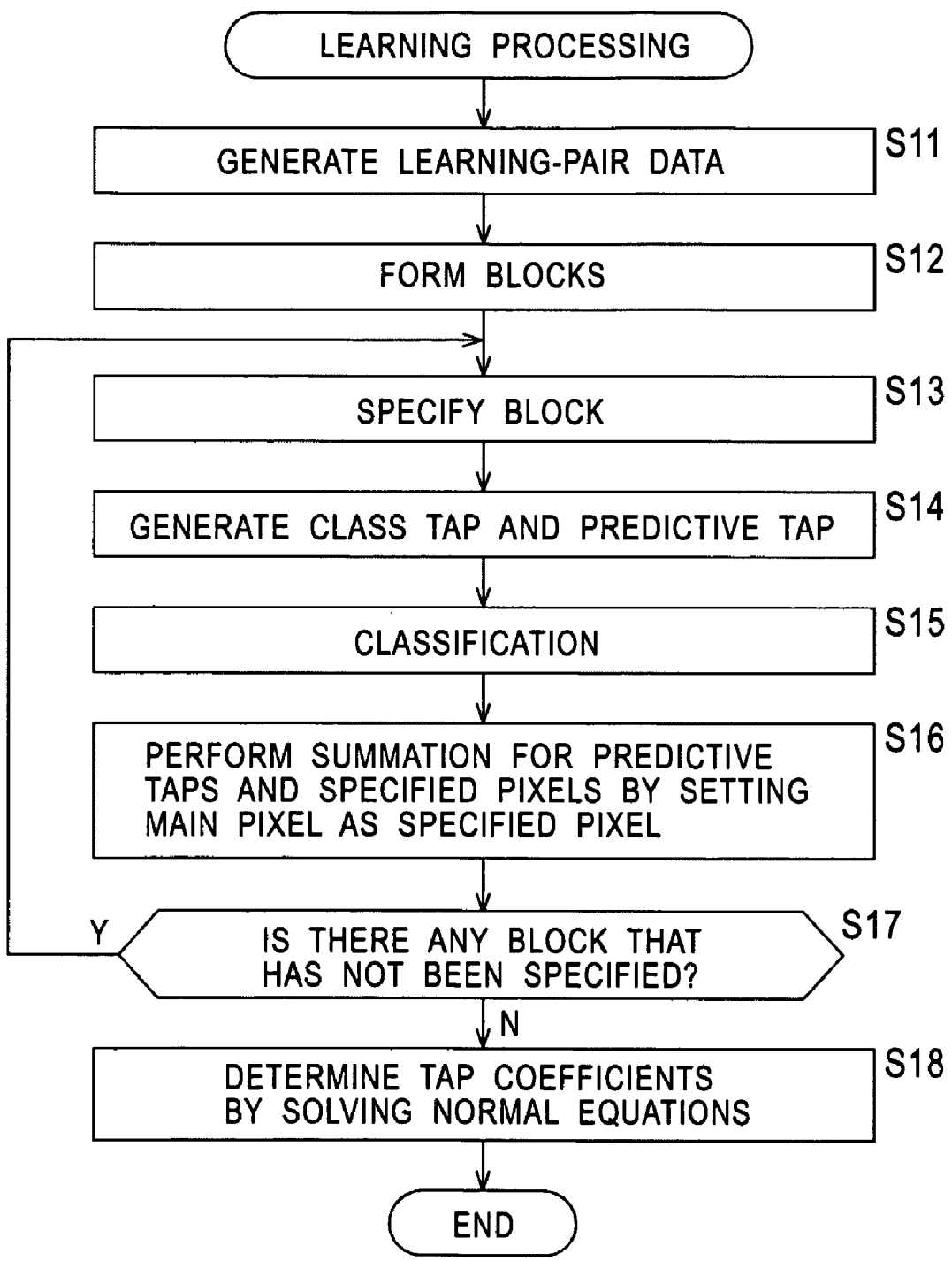
FIG. 7 is a flowchart illustrating learning processing for learning tap coefficients to be stored in the coefficient RAM 5.

Learning processing for determining a tap coefficient for each class performed in the learning device shown in FIG. 5 is described below with reference to the flowchart of FIG. 7.

In step S11, the learning-pair generating circuit 22 reads learning image data from the learning database 21 so as to generate supervisor data and learner data. Also in step S11, the learning-pair generating circuit 22 generates learning-pair data by forming a set of the supervisor data and the learner data, supplies the learning-pair data to the learning-pair database 23, and stores it therein.

The process then proceeds to step S12. In step S12, the class-tap generating circuit 24 forms the HD image data as the supervisor data of the learning-pair data stored in the learning-pair database 23 into blocks, each block consisting of two vertically adjacent HD pixels, in a manner similar to the class-tap generating circuit 2 shown in FIG. 2. The process then proceeds to step S13.

In step S13, the class-tap generating circuit 24 specifies one of the undetermined blocks of the HD image serving as the supervisor data of the learning-pair data stored in the learning-pair database 23, and the process proceeds to step S14. In step S14, the class-tap generating circuit 24 and the predictive-tap generating circuit 25 generate a class tap and a predictive tap for the main pixel of the specified block from the SD pixels as the learner data stored in the learning-pair database 23, and supplies the class tap and the predictive tap to the classification circuit 26 and the summing circuit 27, respectively. The process then proceeds to step S15.

In step S15, as in the classification circuit 4 shown in FIG. 2, the classification circuit 26 classifies the main pixel of the specified block by using the class tap supplied from the class-tap generating circuit 24, and supplies the class code representing the resulting class for the specified block to the summing circuit 27. The process then proceeds to step S16.

In step S16, the summing circuit 27 reads the HD pixel, which is the main pixel of the specified block, from the learning-pair database 23 as the specified pixel. Also in step S16, the summing circuit 27 performs summation in equations (8) for the predictive taps supplied from the predictive-tap generating circuit 25 and the specified pixels read from the learning-pair database 23 for each class of the specified block represented by the class code supplied from the classification circuit 26. The process then proceeds to step S17.

In step S17, the class-tap generating circuit 24 determines whether there is any unspecified block in the HD image data serving as the supervisor data stored in the learning-pair database 23. If it is determined in step S17 that there is an unspecified block in the supervisor data stored in the learning-pair database 23, the process returns to step S13, and processing similar to the above-described processing is repeated.

If it is determined in step S17 that there is no unspecified block in the supervisor data stored in the learning-pair database 23, the summing circuit 27 supplies the normal equations in equations (8) obtained by summing in step S16 for each class to the tap-coefficient computing circuit 28. The process then proceeds to step S18.

In step S18, the tap-coefficient computing circuit 28 solves the normal equations in equations (8) for each class supplied from the summing circuit 27 so as to determine a tap coefficient for each class, supplies the tap coefficient to the tap-coefficient memory 29, and stores it therein. The process is then completed.

The tap coefficient for each class stored in the tap coefficient memory 29 as described above is the same tap coefficient stored in the coefficient RAM 5 of the image processing apparatus shown in FIG. 2. In the main-pixel processing circuit 11 provided with the coefficient RAM 5, HD pixels can be determined as the main pixels in a manner similar to the classification adaptive processing proposed by the present applicant.

In the above-described learning processing for tap coefficients, there may be a class for which a required number of normal equations for determining a tap coefficient cannot be obtained depending on learning image data prepared. For such a class, for example, a default tap coefficient may be output from the tap-coefficient computing circuit 28. Alternatively, if there is any class for which a required number of normal equations for determining a tap coefficient cannot be obtained, new learning image data may be prepared to re-conduct learning for tap coefficients. The same applies to learning for tap coefficient in a learning device, which is described below.

Figure 8:
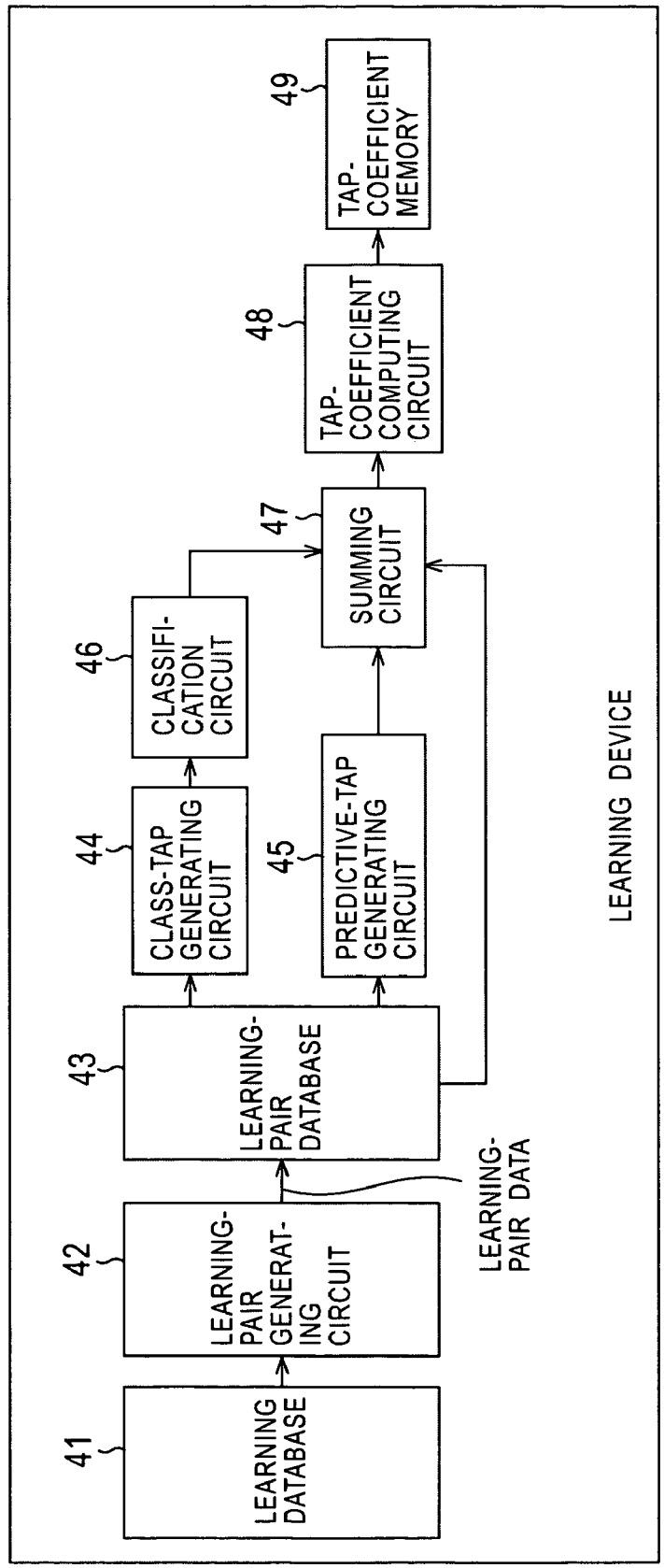
FIG. 8 is a block diagram illustrating an example of the configuration of an embodiment of a learning device for learning tap coefficients to be stored in a coefficient RAM 7.

FIG. 8 illustrates an example of the configuration of an embodiment of a learning device for conducting learning for determining a tap coefficient for each class stored in the coefficient RAM 7 shown in FIG. 2.

The learning device shown in FIG. 8 includes a learning database 41, a learning-pair generating circuit 42, a learning-pair database 43, a class-tap generating circuit 44, a predictive-tap generating circuit 45, a classification circuit 46, a summing circuit 47, a tap-coefficient computing circuit 48, and a tap-coefficient memory 49, which are configured similarly to the learning database 21, the learning-pair generating circuit 22, the learning-pair database 23, the class-tap generating circuit 24, the predictive-tap generating circuit 25, the classification circuit 26, the summing circuit 27, the tap-coefficient computing circuit 28, and the tap-coefficient memory 29, respectively, shown in FIG. 5.

Basically, therefore, in the learning device shown in FIG. 8, a tap coefficient for each of at least one class is determined in a manner similar to the learning device shown in FIG. 5. In the learning device shown in FIG. 8, however, the relationship between supervisor data and learner data is learned for each of at least one class by giving a predetermined constraint condition to the supervisor data, thereby determining a tap coefficient for each of at least one class.

That is, in the learning device shown in FIG. 8, the relationship between supervisor data and learner data is learned by giving a constraint condition that imposes constraint on the relationship between the main pixel and the sub pixel of a block forming the supervisor data. More specifically, by giving a constraint condition that imposes constraint on the difference between the main pixel and the sub pixel, the relationship between the supervisor data and the learner data is learned.

By learning the relationship between the supervisor data and the learner data while imposing constraint on the difference Δy between the main pixel $y^{(1)}$ and the sub pixel $y^{(2)}$, that is, by learning the relationship between the supervisor data and the learner data ideally under the constraint condition that the difference $\Delta y' = y^{(2)\prime} - y^{(1)\prime}$ between the predictive value $y^{(1)\prime}$ of the main pixel and the predictive value $y^{(2)\prime}$ of the sub pixel determined in the product-sum computation in equation (1) coincides with the true value $\Delta y = y^{(2)} - y^{(1)}$ of the difference obtained by subtracting the true value $y^{(1)}$ of the main pixel from the true value $y^{(2)}$ of the sub pixel, the tap coefficient for determining the predictive value $y^{(2)\prime}$ of the sub pixel while maintaining the relationship between the true value $y^{(1)}$ of the main pixel and the true value $y^{(2)}$ of the sub pixel can be obtained.

When an SD image is converted into an HD image by using such a tap coefficient, the situation in which a change in the pixel value becomes opposite to a change in the true value, as discussed with reference to FIG. 1B, can be prevented due to the effect of the constraint condition, i.e., by imposing constraint on the difference between the main pixel and the sub pixel.

It is now assumed that the condition that the difference $\Delta y' = y^{(2)\prime} - y^{(1)\prime}$ between the predictive value $y^{(1)\prime}$ of the main pixel and the predictive value $y^{(2)\prime}$ of the sub pixel (hereinafter sometimes referred to as the "predictive value of the difference") coincides with the true value $\Delta y = y^{(2)} - y^{(1)}$ of the difference between the true value $y^{(1)}$ of the main pixel and the true value $y^{(2)}$ of the sub pixel is used as the constraint condition for imposing constraint on the difference Δy obtained by subtracting the main pixel $y^{(1)}$ from the sub pixel $y^{(2)}$. In actuality, however, it is difficult to satisfy such a constraint condition for the main pixels and the sub pixels of all the blocks.

In the learning device shown in FIG. 8, therefore, the relationship between the supervisor data and the learner data is learned under the constraint condition that the predictive error of the predictive value of the difference Δ'y with respect to the true value Δy is statistically contained to a minimal value.

$$y^{(1)} = \sum_{n=1}^{N} w_n^{(1)} x_n \quad (9)$$

$$y^{(2)} = \sum_{n=1}^{N} w_n^{(2)} x_n \quad (10)$$

The difference $\Delta w_n$ between the tap coefficients $w_n^{(1)}$ and $w_n^{(2)}$ is defined by the following equation.

$$\Delta w_n = w_n^{(2)} - w_n^{(1)} \quad (11)$$

In this case, the difference Δy is determined by the following product-sum computation from equations (9) through (11).

$$\Delta y = \sum_{n=1}^{N} \Delta w_n x_n \quad (12)$$

The constraint condition that the predictive error of the predictive value of the difference Δ'y with respect to the true value Δy is statistically minimized can be satisfied, for example, by the condition that the sum of the predictive errors of the predictive values of the differences Δ'y is minimized, and the tap coefficient $\Delta w_n$ that minimizes the sum of the predictive errors is a tap coefficient satisfying the constraint condition.

The tap coefficient $\Delta w_n$ that minimizes the sum of the predictive errors of the predictive values of the differences Δ'y can be determined by, for example, the method of least squares.

Equation (12) is equivalent to the equation in which the HD pixel y in equation (1) is substituted by the difference Δy and the tap coefficient $w_n$ is substituted by the tap coefficient $\Delta w_n$. Accordingly, the tap coefficient $\Delta w_n$ that minimizes the sum of the predictive errors of the differences y determined in equation (12) can be determined by solving normal equations in equations (13) that are obtained by substituting the HD pixel y in equation (8) by the difference Δy and by substituting the tap coefficient $w_n$ by the tap coefficient $\Delta w_n$.

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} \Delta w_1 \\ \Delta w_2 \\ \vdots \\ \Delta w_N \end{bmatrix} = \begin{bmatrix} \left(\sum_{k=1}^{K} x_{1,k} \Delta y_k\right) \\ \left(\sum_{k=1}^{K} x_{2,k} \Delta y_k\right) \\ \vdots \\ \left(\sum_{k=1}^{K} x_{N,k} \Delta y_k\right) \end{bmatrix} \quad (13)$$

That is, when the tap coefficients for determining the main pixel $y^{(1)}$ and the sub pixel $y^{(2)}$ are indicated by $w_n^{(1)}$ and $w_n^{(2)}$, respectively, the main pixel $y^{(1)}$ and the sub pixel $y^{(2)}$ can be determined by using the tap coefficients $w_n^{(1)}$ and $w_n^{(2)}$ and the predictive tap $x_n$ according to equation (1) by using equations (9) and (10), respectively.

In the learning device shown in FIG. 8, the relationship between the supervisor data $y_k$ and the learner data $x_k$ is learned for each of at least one class by giving the above-described constraint condition to the supervisor data $y_k$, thereby determining the tap coefficient $\Delta w_n$ for each of at least one class.

Accordingly, the learning performed in the learning device shown in FIG. 8 by using the difference Δy of the main pixel $y^{(1)}$ and the sub pixel $y^{(2)}$ of the block as the constrained supervisor data with the constrained condition (hereinafter sometimes referred to as "constrained supervisor data") is equivalent to the learning of the relationship between the constrained supervisor data Δy and the learner data $x_k$.

Accordingly, in the learning-pair generating circuit 42, a set of constrained supervisor data and learner data is generated as learning-pair data rather than a set of supervisor data itself and learner data. In the summing circuit 47, summing in equations (13) for the constrained supervisor data and the learner data is performed rather than summing in equations (8) for the supervisor data and the learner data.

Figure 9:
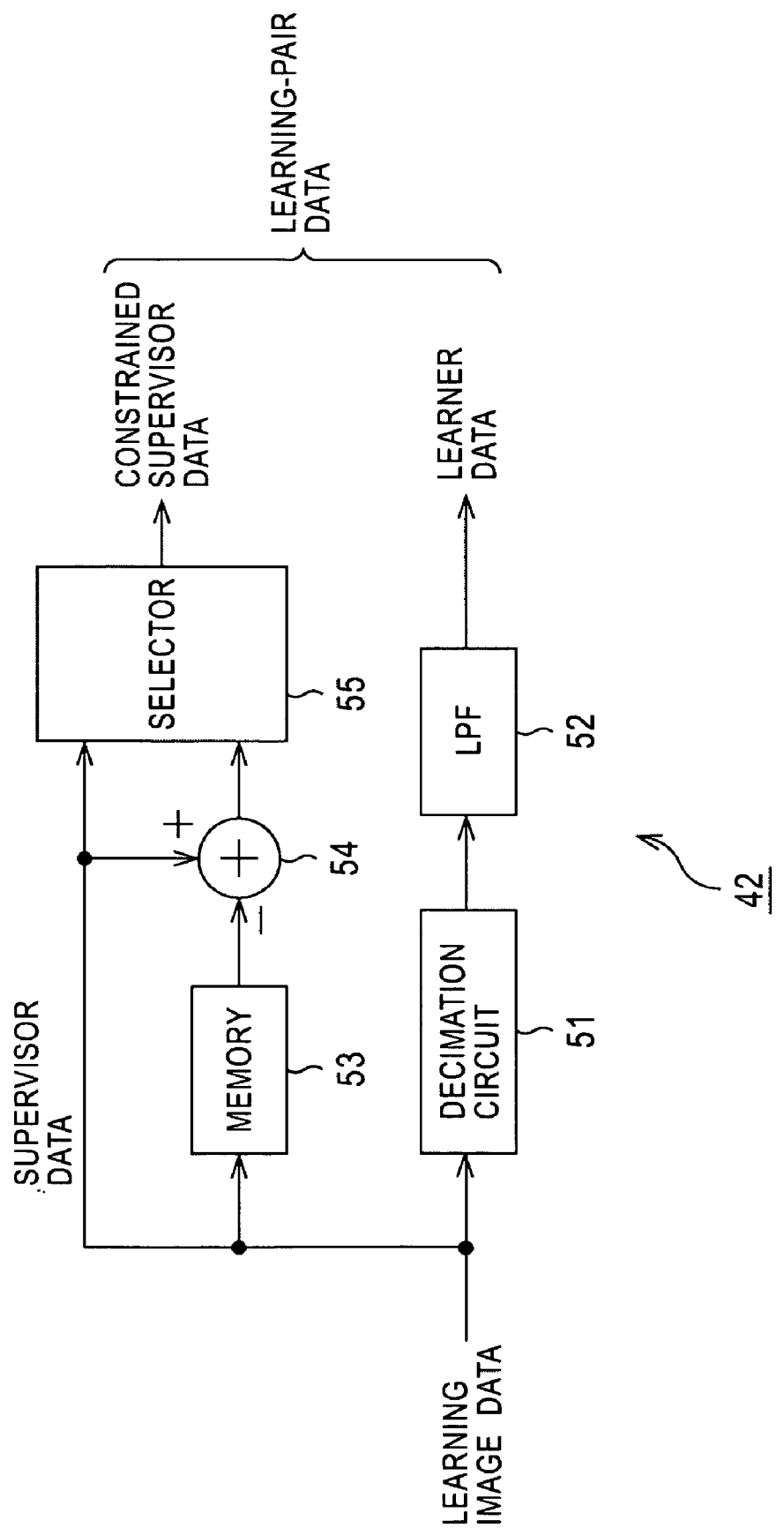
FIG. 9 is a block diagram illustrating an example of the configuration of a learning-pair generating circuit 42.

FIG. 9 illustrates an example of the configuration of the learning-pair generating circuit 42 shown in FIG. 8.

HD image data serving as learning image data stored in the learning database 41 (FIG. 8) is supplied to the learning-pair generating circuit 42, and the learning-pair generating circuit 42 supplies the HD image data to a decimation circuit 51, a memory 53, a computation circuit 54, and a selector 55 as the supervisor data.

As in the decimation circuit 31 shown in FIG. 6, the decimation circuit 51 reduces the number of pixels of the HD image data as the supervisor data, and supplies the resulting SD image data to an LPF 52. The LPF 52 having predetermined frequency characteristics, similar to the LPF 32 shown in FIG. 6, filters the SD image data supplied from the decimation circuit 51 so as to obtain the blurred SD image data, and outputs the SD pixels forming the SD image data serving as the learner data.

The memory 53 temporarily stores the HD image data as the supervisor data supplied from the learning database 41, and supplies the HD pixel to serve as the main pixel $y^{(1)}$ of a block when being divided from the HD image data to the computation circuit 54.

The computation circuit 54 receives the HD pixel to serve as the sub pixel $y^{(2)}$ of the block when being divided from the HD image data as the supervisor data supplied from the learning database 41. The computation circuit 54 also subtracts the main pixel $y^{(1)}$ of the block supplied from the memory 53 from the sub pixel $y^{(2)}$ of the same block so as to determine the difference $\Delta y = y^{(2)} - y^{(1)}$, and outputs the difference Δy to the selector 55.

As for the HD image data to serve as the main pixel of the block when being divided from the HD image data as the supervisor data supplied from the learning database 41, the selector 55 selects the HD pixel as it is. As for the HD pixel to serve as the sub pixel, the selector selects the difference Δy output from the computation circuit 54. The main pixel and the sub pixel are then output as the constrained supervisor data.

Accordingly, as the constrained supervisor data output from the selector 55, the main pixel has the pixel value of the HD pixel itself as the supervisor data, and the sub pixel has the pixel value obtained by subtracting the pixel value of the main pixel from the pixel value of the sub pixel.

The learning-pair generating circuit 42 outputs a set of the constrained supervisor data and the learner data obtained as described above to the learning-pair database 43 (FIG. 8) as the learning-pair data.

Figure 10:
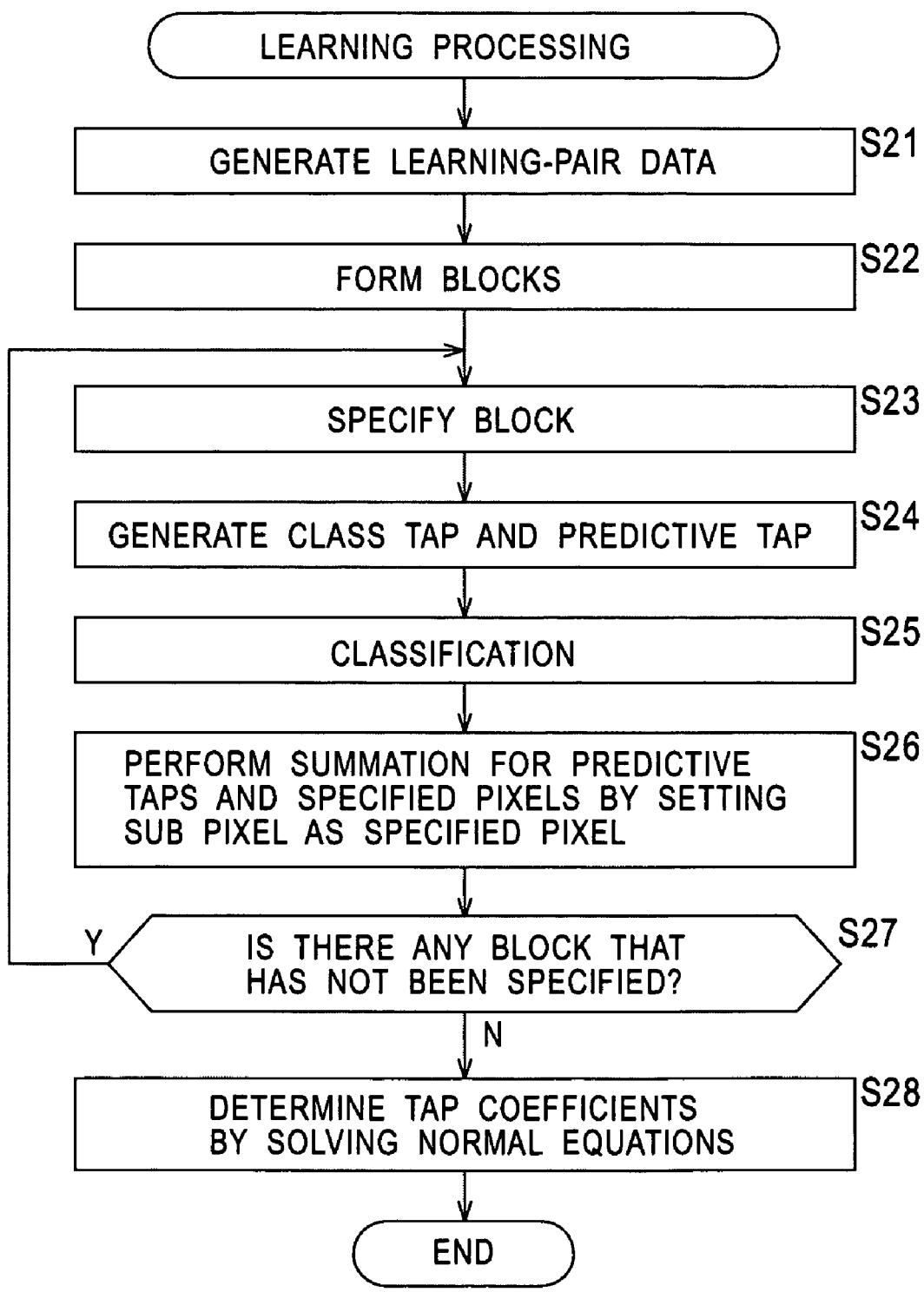
FIG. 10 is a flowchart illustrating learning processing for learning tap coefficients to be stored in the coefficient RAM 7.

Learning processing for determining a tap coefficient for each class performed in the learning device in FIG. 8 is described below with reference to the flowchart of FIG. 10.

In step S21, the learning-pair generating circuit 42 reads learning image data from the learning database 41, and generates constrained supervisor data and learner data. Also in step S21, the learning-pair generating circuit 42 generates learning-pair data formed of a set of the constrained supervisor data and the learner data, supplies the learning-pair data to the learning-pair database 43, and stores it therein.

The process then proceeds to step S22. In step S22, the class-tap generating circuit 44 divides the constrained supervisor data of the learning-pair data stored in the learning-pair database 43 into blocks, each block consisting of two vertically adjacent HD pixels, in a manner similar to the class-tap generating circuit 2 shown in FIG. 2. The process then proceeds to step S23.

In step S23, the class-tap generating circuit 44 specifies one of the undetermined blocks of the constrained supervisor data of the learning-pair data stored in the learning-pair database 43, and the process proceeds to step S24. In step S24, the class-tap generating circuit 44 and the predictive-tap generating circuit 45 generate a class tap and a predictive tap, respectively, for the sub pixel of the specified block from the SD pixels as the learner data stored in the learning-pair database 43, and supplies the class tap and the predictive tap to the classification circuit 46 and the summing circuit 47, respectively. The process then proceeds to step S25.

In step S25, as in the classification circuit 4 shown in FIG. 2, the classification circuit 46 classifies the sub pixel of the specified block by using the class tap supplied from the class-tap generating circuit 44, and supplies the class code representing the resulting class of the specified block to the summing circuit 47. The process then proceeds to step S26.

In step S26, the summing circuit 47 reads the difference Δy of the pixel value of the HD pixel, which serves as the sub pixel of the specified block, from the learning-pair database 43 as the specified pixel. Also in step S26, the summing circuit 47 performs summation in equations (13) for the predictive taps supplied from the predictive-tap generating circuit 45 and the specified pixels read from the learning-pair database 43 for each class of the specified block represented by the class code supplied from the classification circuit 46. The process then proceeds to step S27.

In step S27, the class-tap generating circuit 44 determines whether there is any unspecified block in the blocks of the constrained supervisor data stored in the learning-pair database 43. If it is determined in step S27 that there is an unspecified block in the blocks of the constrained supervisor data stored in the learning-pair database 43, the process returns to step S23, and processing similar to the above-described processing is repeated.

If it is determined in step S27 that there is no unspecified block in the blocks of the constrained supervisor data stored in the learning-pair database 43, the summing circuit 47 supplies the normal equations (13) obtained for each class by performing summation in step S26 to the tap-coefficient computing circuit 48. The process then proceeds to step S28.

In step S28, the tap-coefficient computing circuit 48 solves the normal equations in (13) for each class supplied from the summing circuit 47 so as to determine the tap coefficient $\Delta w_n$ for each class, and supplies the tap coefficient to the tap-coefficient memory 49 and stores it therein. The process is then completed.

The tap coefficient $\Delta w_n$ for each class stored in the tap-coefficient memory 49 as described above is the same tap coefficient stored in the coefficient RAM 7 of the image processing apparatus shown in FIG. 2. Then, in the sub-pixel processing circuit 12 provided with the coefficient RAM 7, by performing product-sum computation of equation (12) corresponding to equation (1) by using the tap coefficient $\Delta w_n$ stored in the coefficient RAM 7 and the predictive tap $x_n$, the predictive-computation circuit 8 determines the predictive value of the difference Δy of the sub pixel $y^{(2)}$ to the main pixel $y^{(1)}$ that minimizes the sum of the predictive errors. In the decoding circuit 9, the difference Δy is added to the predictive value of the main pixel $y^{(1)}$ stored in the frame memory 10 so as to determine the predictive value of the sub pixel $y^{(2)}$.

Accordingly, since the sub pixel is determined by using the tap coefficient that can maintain the relationship between the sub pixel and the main pixel, a high-quality HD image can be obtained in the image processing apparatus shown in FIG. 2 by preventing the situation in which a change in the pixel value of the HD image to be determined becomes opposite to a change in the true value.

Figure 11:
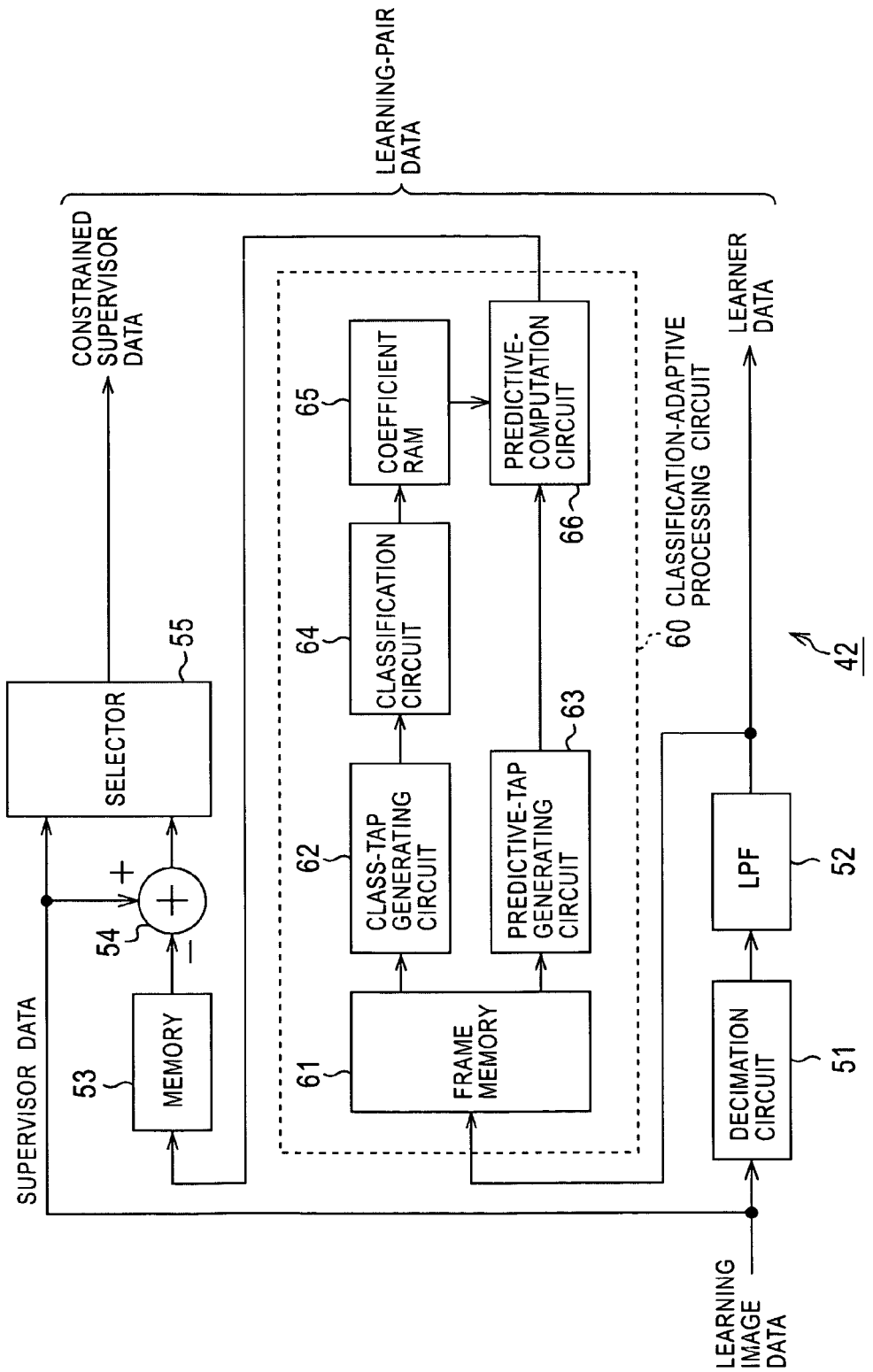
FIG. 11 is a block diagram illustrating another example of the configuration of the learning-pair generating circuit 42.

FIG. 11 illustrates another example of the configuration of the learning-pair generating circuit 42 shown in FIG. 8. In FIG. 11, the elements corresponding to those of FIG. 9 are designated with like reference numerals, and an explanation thereof is thus omitted. That is, the learning-pair generating circuit 42 shown in FIG. 11 is configured similarly to that of FIG. 9, except that a new element, i.e., a classification-adaptive processing circuit 60, is disposed.

SD image data as learner data output from the LPF 52 is supplied to the classification-adaptive processing circuit 60. The classification-adaptive processing circuit 60 performs classification adaptive processing previously proposed by the present applicant on the SD image data as the learner data so as to determine the predictive value of the HD image data as the supervisor data, and supplies the HD image data to the memory 53.

More specifically, the classification-adaptive processing circuit 60 includes a frame memory 61, a class-tap generating circuit 62, a predictive-tap generating circuit 63, a classification circuit 64, a coefficient RAM 65, and a predictive-computation circuit 66, which are similarly configured to the frame memory 1, the class-tap generating circuit 2, the predictive-tap generating circuit 3, the classification circuit 4, the coefficient RAM 5, and the predictive-computation circuit 6, respectively, shown in FIG. 2. As in the image processing apparatus shown in FIG. 2, the classification-adaptive processing circuit 60 performs classification adaptive processing for converting SD image data as the learner data supplied from the LPF 52 into HD image data, and supplies the resulting HD image data to the memory 53.

In the classification-adaptive processing circuit 60, however, classification adaptive processing is performed, assuming that all the blocks of the HD image data consist of main pixels. That is, in the classification-adaptive processing circuit 60, the tap coefficients determined by the learning device shown in FIG. 5 are stored in the coefficient RAM 65, and all the HD pixels forming the blocks of the HD image data are determined by performing product-sum computation of equation (1) using the tap coefficients stored in the coefficient RAM 65.

Accordingly, in the embodiment of FIG. 11, the predictive values of the supervisor data determined by the classification-adaptive processing circuit 60 are stored in the memory 53 rather than the supervisor data itself as the learning image data stored in the learning database 41. As a result, in the computation circuit 54 shown in FIG. 11, the difference Δy is determined by subtracting the predictive value of the main pixel $y^{(1)}$ of the block divided from the HD image data as the supervisor data supplied from the learning database 41 and stored in the memory 53 from the HD pixel serving as the sub pixel $y^{(2)}$ of the same block. That is, the difference Δy is determined as the constrained supervisor data by subtracting, not the main pixel $y^{(1)}$ itself of the block, but the predictive value of the main pixel $y^{(1)}$ determined by the classification-adaptive processing circuit 60, from the HD pixel serving as the sub pixel $y^{(2)}$ of the same block.

Thus, tap coefficients having higher prediction precision for sub pixels (having smaller predictive errors for sub pixels) can be determined compared to when the learning-pair generating circuit 42 is configured, as shown in FIG. 9.

More specifically, in the image processing apparatus shown in FIG. 2, the predictive value of the difference Δy between the sub pixel $y^{(2)}$ and the main pixel $y^{(1)}$ is determined by performing product-sum computation of equation (12) using the predictive tap $x_k$ and the tap coefficient $\Delta w_n$ in the predictive-computation circuit 8 of the sub-pixel processing circuit 12. Then, in the decoding circuit 9, the predictive value of the main pixel $y^{(1)}$ determined in the main-pixel processing circuit 11 is added to the predictive value of the difference y determined in the predictive-computation circuit 8, thereby determining the predictive value of the sub pixel $y^{(2)}$.

Not the true value of the main pixel, but the predictive value of the main pixel is used for determining the sub pixel in the image processing apparatus shown in FIG. 2. Accordingly, also in the learning-pair generating circuit 42 of the learning device shown in FIG. 8, if the predictive value of the main pixel is used for generating the constrained supervisor data rather than the true value of the main pixel, the prediction precision of the sub pixel in the image processing apparatus shown in FIG. 2 can be improved.

In the embodiment shown in FIG. 11, the predictive values of the all the HD pixels of the HD image data as the supervisor data are determined in the classification-adaptive processing circuit 60. In the memory 53 and the computation circuit 54, which are the subsequent stage of the classification-adaptive processing circuit 60, among the HD pixels output from the classification-adaptive processing circuit 60, only the HD pixels to serve as the main pixels in the image processing apparatus in FIG. 2 are used. Accordingly, in the classification-adaptive processing circuit 60, only HD pixels to serve as main pixels in the image processing apparatus in FIG. 2 may be determined, and HD pixels to serve as sub pixels may be ignored (not processed).

Figure 12:
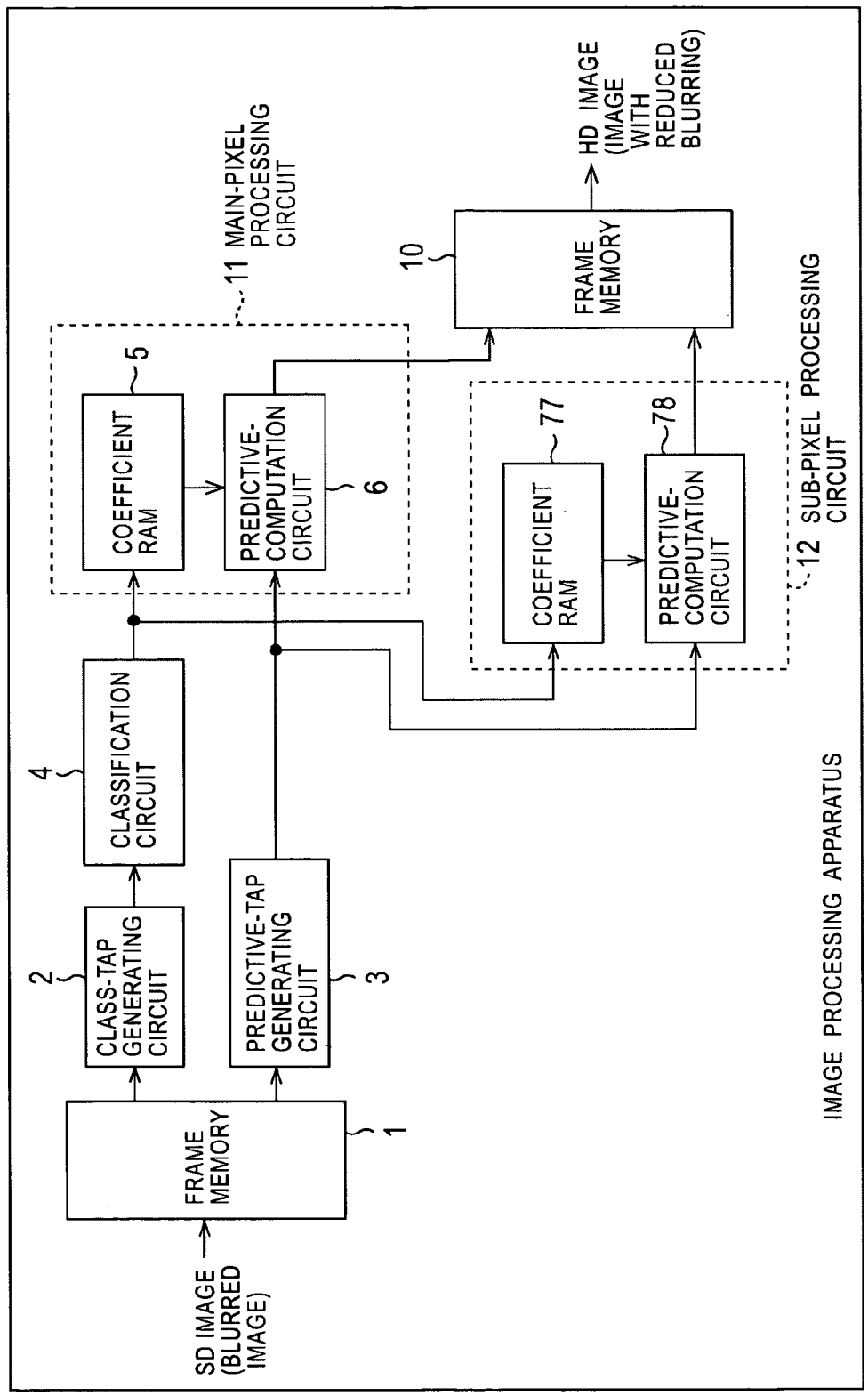
FIG. 12 is a block diagram illustrating an example of the configuration of a second embodiment of the image processing apparatus to which the present invention is applied.

FIG. 12 illustrates an example of the configuration of another embodiment of the image processing apparatus to which the present invention is applied. In FIG. 12, the elements corresponding to those shown in FIG. 2 are designated with like reference numerals, and an explanation thereof is thus omitted. That is, the image processing apparatus shown in FIG. 12 is configured similarly to that shown in FIG. 2, except that the sub-pixel processing circuit 12 is formed of a coefficient RAM 77 and a predictive-computation circuit 78 instead of the coefficient RAM 7, the predictive-computation circuit 8, and the decoding circuit 9.

In the coefficient RAM 77, a tap coefficient for each class obtained by adding the tap coefficient $w_n$ for each class stored in the coefficient RAM 5 shown in FIG. 2 to the tap coefficient $\Delta w_n$ stored in the coefficient RAM 7 is stored. The coefficient RAM 77 reads the tap coefficient of the class represented by the class code of the specified block supplied from the classification circuit 4 so as to obtain the read tap coefficient, and supplies it to the predictive-computation circuit 78.

The predictive-computation circuit 78 performs product-sum computation corresponding to equation (1) by using the tap coefficient of the class of the specified block supplied from the coefficient RAM 77 and the predictive tap of the specified block supplied from the predictive-tap generating circuit 3, thereby determining the predictive value of the sub pixel of the specified block. The predictive-computation circuit 78 then supplies the determined sub pixel to the corresponding address of the frame memory 10, and stores it therein.

That is, according to the learning operation performed by using constrained supervisor data, the tap coefficient $\Delta w_n$, which is used for product-sum computation in equation (12), for determining the difference $\Delta y$ by subtracting the main pixel $y^{(1)}$ from the sub pixel $y^{(2)}$, is obtained. The tap coefficient $\Delta w_n$ is defined in equation (11).

The tap coefficient $w_n^{(2)}$ can be found according to the following equation from equation (11).

$$w_n^{(2)} = w_n^{(1)} + \Delta w_n \qquad (14)$$

According to equation (14), the tap coefficient $w_n^{(2)}$ is obtained by the tap coefficient $\Delta w_n$ that is determined by performing learning using the constrained supervisor data. Accordingly, in other words, the tap coefficient $w_n^{(2)}$ is determined by performing learning using the constrained supervisor data. Then, according to the tap coefficient $w_n^{(2)}$, the predictive value of the sub pixel $y^{(2)}$ can be determined by product-sum computation of equation (10) corresponding to equation (1).

In the embodiment shown in FIG. 12, the tap coefficient $w_n^{(2)}$ for each class expressed by equation (14) is stored in the coefficient RAM 77. Then, in the predictive-computation circuit 78, product-sum computation of equation (10) is performed by using the tap coefficient $w_n^{(2)}$ and the predictive tap $x_n$ output from the predictive-tap generating circuit 3, thereby determining the sub pixel $y^{(2)}$.

Figure 4:
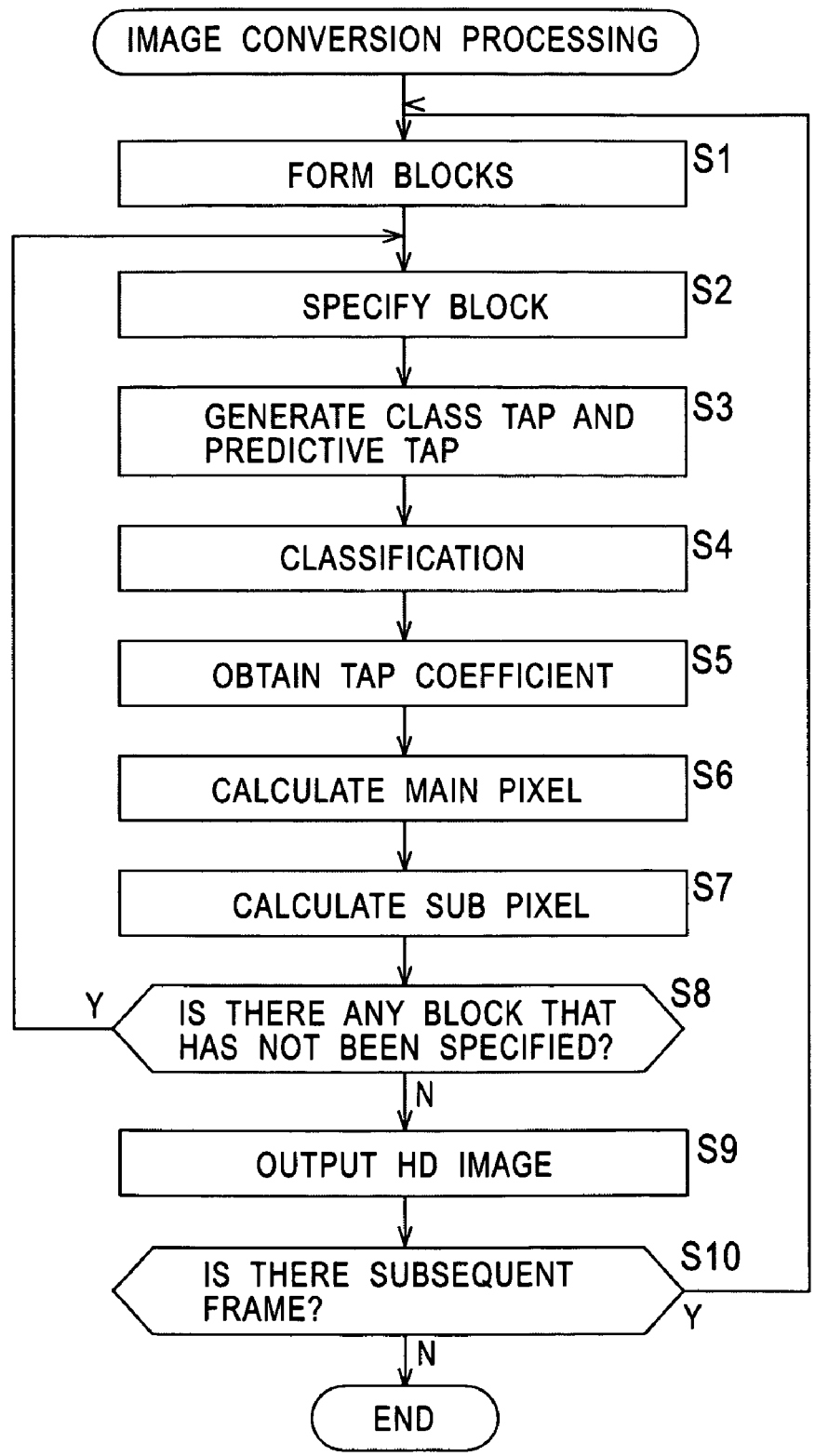
FIG. 4 is a flowchart illustrating processing performed by the image processing apparatus.

Accordingly, in the image processing apparatus shown in FIG. 12, in step S5 of FIG. 4, instead of obtaining the tap coefficient $\Delta w_n$ from the coefficient RAM 7, the tap coefficient $w_n^{(2)}$ is obtained from the coefficient RAM 77. In step S8, in the image processing apparatus in FIG. 2, the difference $\Delta y$ is determined by product-sum computation of equation (12) using the tap coefficient $\Delta w_n$ stored in the coefficient RAM 7 and the predictive tap $x_n$, and the difference $\Delta y$ and the main pixel $y^{(1)}$ are added, thereby determining the sub pixel $y^{(2)}$. Instead of this operation, in the image processing apparatus in FIG. 12, in step S8, the sub pixel $y^{(2)}$ is determined by product-sum computation of equation (10) using the tap coefficient $w_n^{(2)}$ stored in the coefficient RAM 77 and the predictive tap $x_n$. The other steps are similar to those of the flowchart of FIG. 4, and thus, an explanation of the processing of the image processing apparatus in FIG. 12 is omitted.

As in the image processing apparatus shown in FIG. 2, in the image processing apparatus shown in FIG. 12, the sub pixel is determined by using the tap coefficient that can maintain the relationship between the sub pixel and the main pixel. Accordingly, it is possible to prevent the situation in which a change in the pixel value of an HD image to be determined becomes opposite to a change in the true value of the pixel of the HD image, thereby obtaining a higher-quality HD image.

The tap coefficient $w_n^{(2)}$ stored in the coefficient RAM 77 may be determined by adding the tap coefficient $w_n^{(1)}$ determined in the learning device in FIG. 5 to the tap coefficient $\Delta w_n$ determined in the learning device in FIG. 8. Alternatively, the learning devices shown in FIGS. 5 and 8 may be integrally formed, and a circuit for adding the tap coefficient $w_n^{(1)}$ output from the tap-coefficient computing circuit 28 to the tap coefficient $\Delta w_n$ output from the tap-coefficient computing circuit 48 may be provided for the integrated learning device, thereby determining the tap coefficient $w_n^{(2)}$.

In the embodiment shown in FIG. 2, in the sub-pixel processing circuit 12, the difference between the main pixel and the sub pixel is determined by using the pixel values $x^{(1)}$ through $x^{(9)}$ themselves of the SD pixels shown in FIG. 3 as the predictive taps. Alternatively, the difference between the main pixel and the sub pixel may be determined by using the differences of the pixel values $x^{(1)}$ through $x^{(9)}$ as the predictive taps. That is, the difference between the main pixel and the sub pixel may be determined by using the differences of, for example, two vertically adjacent SD pixels of the pixel values $x^{(1)}$ through $x^{(9)}$ of the SD pixels, i.e., $x^{(1)}-x^{(4)}$, $x^{(2)}-x^{(5)}$, $x^{(3)}-x^{(6)}$, $x^{(4)}-x^{(7)}$, $x^{(5)}-x^{(8)}$, and $x^{(6)}-x^{(9)}$, as the predictive taps. In this case, however, predictive taps similar to those obtained as described above must be used in the learning device shown in FIG. 8.

Figure 13:
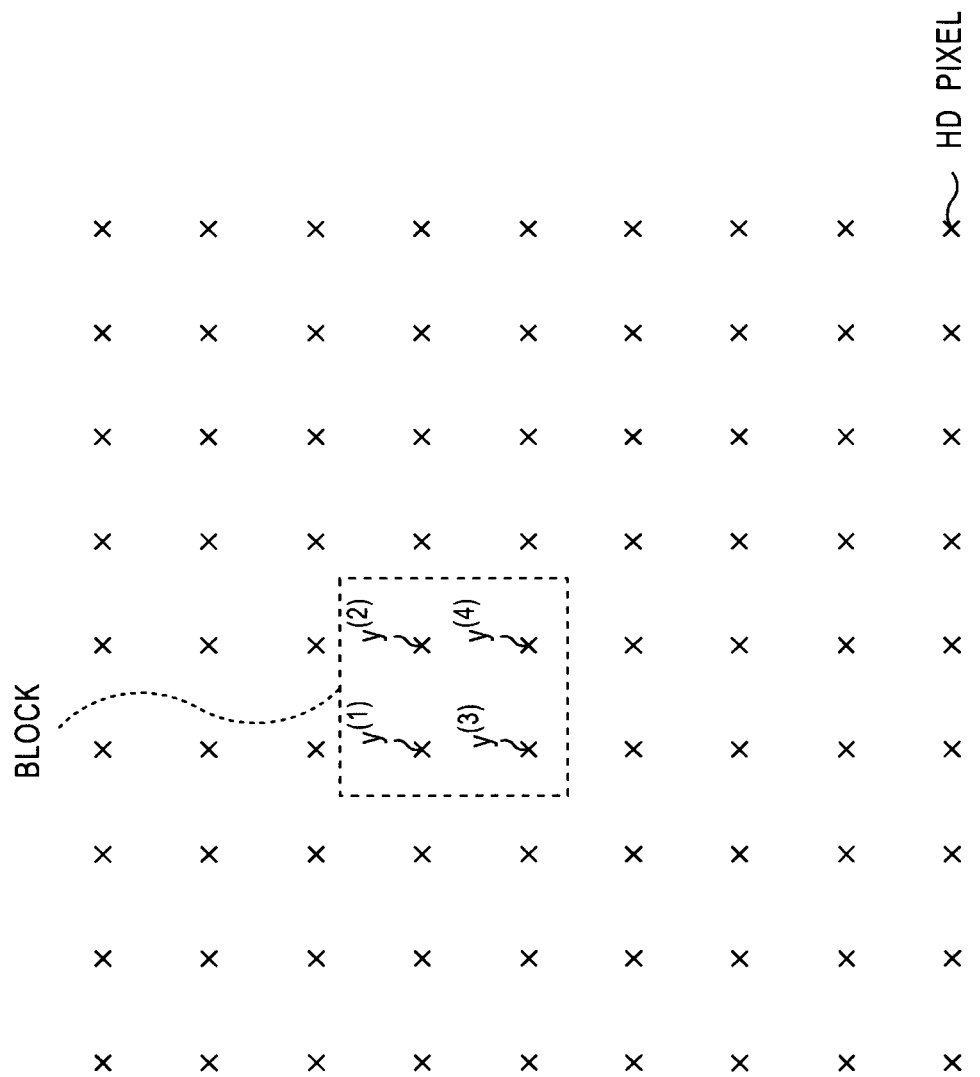
FIG. 13 illustrates another example of a block of HD image data.

In this embodiment, for the sake of simplicity, HD image data is divided into blocks, each block consisting of two vertically adjacent HD pixels. However, each block may consist of three or more HD pixels. That is, the block may consist of, as shown in FIG. 13, two-row×two-column HD pixels $y^{(1)}$, $y^{(2)}$, $y^{(3)}$, and $y^{(4)}$.

In a block, the HD pixel used as the main pixel is not restricted to one pixel. For example, if a block is formed of the four HD pixels $y^{(1)}$ through $y^{(4)}$, as shown in FIG. 13, one HD pixel $y^{(1)}$ may be used as the main pixel, and the remaining three HD pixels $y^{(2)}$ through $y^{(4)}$ may be used as the sub pixels. Alternatively, for example, the two HD pixels $y^{(1)}$ and $y^{(2)}$ may be used as the main pixels, and the remaining two HD pixels $y^{(3)}$ and $y^{(4)}$ may be used as the sub pixels.

In the learning device shown in FIG. 8, the difference obtained by subtracting the main pixel from the sub pixel is used as the constrained supervisor data in the learning-pair generating circuit 42. Alternatively, the difference obtained by subtracting another sub pixel from the sub pixel may be used as the constrained supervisor data. For example, it is now assumed, as shown in FIG. 13, that a block is formed of the four HD pixels $y^{(1)}$ through $y^{(4)}$, and that one HD pixel $y^{(1)}$ is used as the main pixel, and the remaining three HD pixels $y^{(2)}$ through $y^{(4)}$ are used as the sub pixels. In this case, for example, for the sub pixel $y^{(2)}$, the difference obtained by subtracting the main pixel $y^{(1)}$ from the sub pixel $y^{(2)}$ may be used as the constrained supervisor data; for the sub pixel $y^{(3)}$, the difference obtained by subtracting the sub pixel $y^{(2)}$ from the sub pixel $y^{(3)}$ may be used as the constrained supervisor data; and for the sub pixel $y^{(4)}$, the difference obtained by subtracting the sub pixel $y^{(3)}$ from the sub pixel $y^{(4)}$ may be used as the constrained supervisor data. In this case, in the decoding circuit 9 of the image processing apparatus shown in FIG. 2, the sub pixel $y^{(2)}$ is determined by adding the main pixel $y^{(1)}$ stored in the frame memory 10 to the difference output from the predictive-computation circuit 8; the sub pixel $y^{(3)}$ is determined by adding the sub pixel $y^{(2)}$ stored in the frame memory 10 to the difference output from the predictive-computation circuit 8; and the sub pixel $y^{(4)}$ is determined by adding the sub pixel $y^{(3)}$ stored in the frame memory 10 to the difference output from the predictive-computation circuit 8.

In this embodiment, a constraint condition for imposing constraint on the difference of the sub pixel to the single main pixel is given to the sub pixel serving as the supervisor data. However, a constraint condition for imposing constraint on the difference of the sub pixel to each of a plurality of pixels may be given to the sub pixel. For example, in the block shown in FIG. 13, if $y^{(4)}$ is set as the sub pixel, the differences $y^{(4)}-y^{(1)}$, $y^{(4)}-y^{(2)}$, and $y^{(4)}-y^{(3)}$ may be used as the constrained supervisor data for performing summation in the summing circuit 47 shown in FIG. 8.

In the embodiment in FIG. 2, two vertically adjacent HD pixels are used as one block, and the upper HD pixel and the lower HD pixel are used as the main pixel and the sub pixel, respectively. Then, the predictive value of the difference between the sub pixel and the main pixel is added to the predictive value of the main pixel, thereby determining the predictive value of the sub pixel (reproducing the sub pixel). Alternatively, each HD pixel for one frame (field) may be determined as follows. The predictive value of each HD pixel is set as the sub pixel, and is determined by adding the predictive value of the difference of the sub pixel to the predictive value of the HD pixel which is adjacently disposed above the sub pixel. In this case, for an HD pixel on the topmost line, the HD pixel is set as the main pixel, and the predictive value of the main pixel is determined. Alternatively, the true value of an HD pixel on the topmost line is obtained by a certain method.

In this embodiment, in the learning device, the relationship between supervisor data and learner data is learned by giving a predetermined constraint condition to the supervisor data, thereby obtaining a tap coefficient that can determine the predictive value of each HD pixel reflecting the relationship of the HD pixel with the other HD pixels both serving as the supervisor data. In other words, the learning operation with a constraint condition given to the supervisor data learns the relationship between the features obtained by a plurality of samples (a plurality of HD pixels) of the supervisor data and the samples of the learner data.

That is, as stated above, in the learning device shown in FIG. 8, the difference obtained by subtracting a main pixel from the true value of a sub pixel is set as the constrained supervisor data, and the relationship between the constrained supervisor data and learner data is learned. In this case, in other words, the difference obtained by subtracting the main pixel from the sub pixel represents the features of the two HD pixels, i.e., the feature of the HD pixel as the main pixel and the feature of the HD pixel as the sub pixel. In the learning device shown in FIG. 8, therefore, the relationships between the features obtained from a plurality of HD pixels of the supervisor data and a plurality of SD pixels as the learner data are learned, and the tap coefficients for associating the supervisor data with the learner data are determined.

The features obtained from a plurality of HD pixels of the supervisor data are not restricted to the differences.

A plurality of HD pixels used for obtaining features are not restricted to two HD pixels, and three or more HD pixels can be used.

More specifically, as the features obtained from a plurality of HD pixels of the supervisor data, differences obtained from, for example, three HD pixels, may be used. In this case, in the learning device in FIG. 8, for example, three vertically (or horizontally) adjacent HD pixels of the supervisor data may be set as a, b, and c from the top. Then, the difference $\Delta 1 = b - a$ obtained by subtracting the topmost HD pixel a from the second HD pixel b from the top is determined. Then, the difference $\Delta 1$ is added to the second HD pixel b from the top so as to determine the bottommost HD pixel c, i.e., the provisional predictive value $c' = b + \Delta 1$. Then, the difference $\Delta 2 = c' - c$ obtained by subtracting the true value c from the provisional predictive value c' of the HD pixel c is used as the feature obtained from the three HD pixels a, b, and c. The tap coefficient that associates the difference $\Delta 2$ with the predictive tap obtained from the learner data is learned.

In this case, in the image processing apparatus in FIG. 2, the topmost HD pixel a and the second HD pixel b from the top are used as the main pixels, and the predictive values of the HD pixels a and b are determined in the main-pixel processing circuit 11. As for the bottommost HD pixel c, in the sub-pixel processing circuit 12, the predictive value of the difference $\Delta 1$ is determined from the predictive values of the HD pixels a and b determined in the main-pixel processing circuit 11, and is added to the HD pixel b determined in the main-pixel processing circuit 11, thereby determining the provisional predictive value c' of the HD pixel c. In the sub-pixel processing circuit 12, the predictive value of the difference $\Delta 2$ obtained from the three HD pixels a, b, and c as the feature is determined by using the tap coefficient obtained by learning, and the difference $\Delta 2$ is subtracted from the provisional predictive value c' of the HD pixel c, thereby determining the predictive value of the HD pixel c.

The above-described series of processings may be performed by using hardware or software. If software is used, a software program is installed into, for example, a general-purpose computer.

Figure 14:
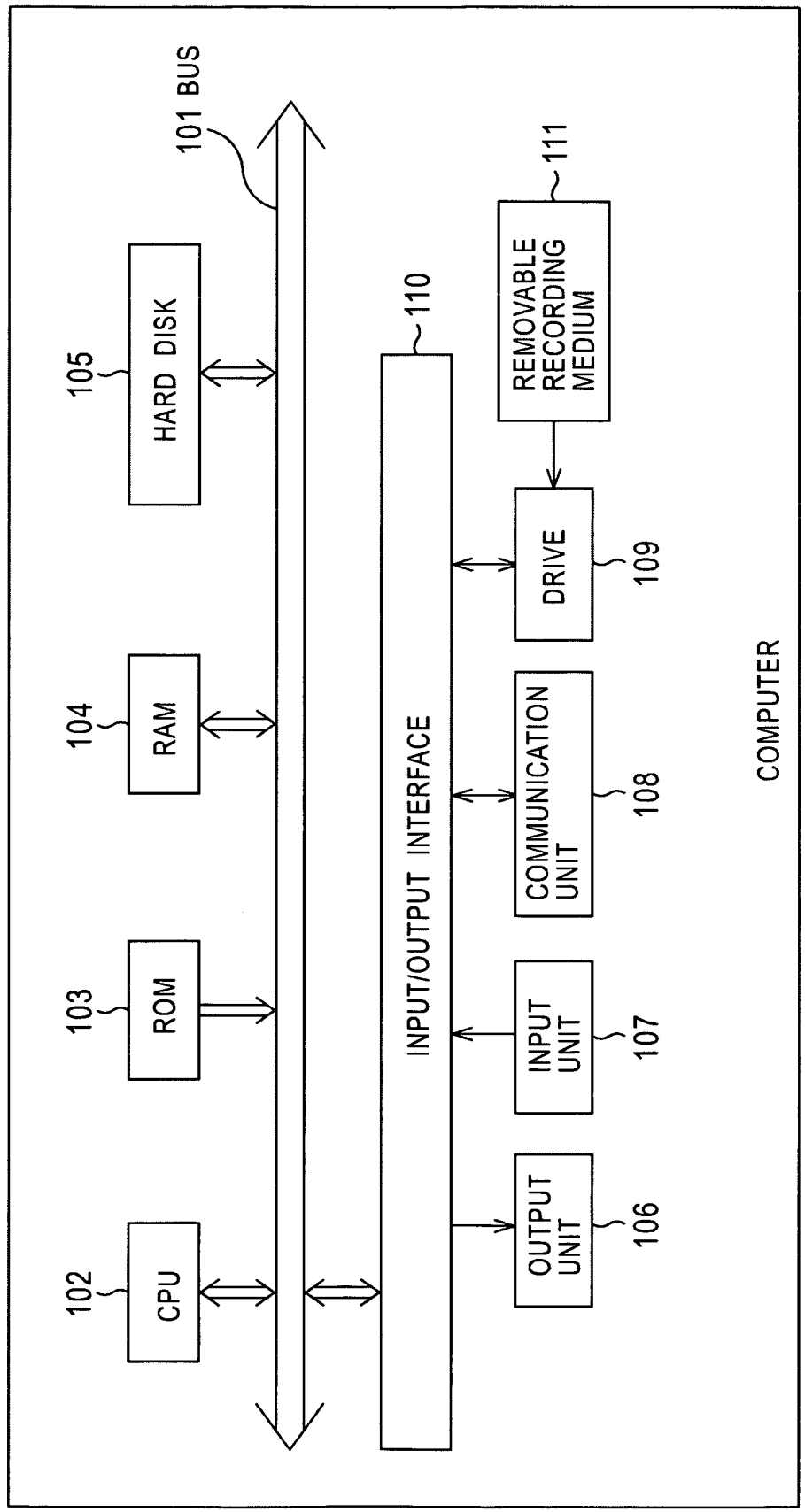
FIG. 14 is a block diagram illustrating an example of the configuration of an embodiment of a computer to which the present invention is applied.

FIG. 14 illustrates an example of the configuration of an embodiment of a computer into which a program executing the above-described series of processings is installed.

A program can be prerecorded in a hard disk 105 or a ROM 103, which serves as a recording medium integrated in the computer.

Alternatively, the program may be temporarily or permanently stored (recorded) in a removable recording medium 111, such as a flexible disk, a CD-ROM (Compact Disc Read Only Memory), an MO (Magneto Optical) disk, a DVD (Digital Versatile Disc), a magnetic disk, or a semiconductor memory. The removable recording medium 111 can be provided as so-called "package software".

The program may be installed into the computer from the above-described removable recording medium 111, and may also be transferred to the computer by wireless means from a download site via an artificial satellite for digital satellite broadcasting, or may be transferred to the computer by wired means via a network, such as a LAN (Local Area Network) or the Internet. Then, the computer is able to receive the program transferred as described above by a communication unit 108 and install the program into the built-in hard disk 105.

The computer has a built-in CPU (Central Processing Unit) 102. An input/output interface 110 is connected to the CPU 102 via a bus 101. Upon the input of an instruction by operating an input unit 107, which consists of a keyboard, a mouse, or a microphone, by the user via the input/output interface 110, the CPU 102 executes a program stored in the ROM (Read Only Memory) 103. The CPU 102 also loads the following types of programs into a RAM (Random Access Memory) 104 and executes them: a program stored in the hard disk 105, a program transferred from a satellite or a network, received by the communication unit 108, and installed into the hard disk 105, and a program read from the removable recording medium 111 loaded in a drive 109 and installed into the hard disk 105. Accordingly, the CPU 102 executes the processings indicated by the above-described flowcharts or the processings performed by the functions of the above-described block diagrams. The CPU 102 then outputs the processing results, if necessary, from an output unit 106, which consists of an LCD (Liquid Crystal Display) or a speaker, or transmits the processing results from the communication unit 108, or records them in the hard disk 105, via the input/output interface 110.

Steps forming the programs for allowing the computer to execute the various processings are not necessarily performed in chronological order as described in the flowcharts of the specification. Alternatively, the steps may be performed concurrently or individually (for example, concurrent processing or object processing are included).

The programs may be performed by a single computer, or a plurality of computers may be used for performing distribute processing on the programs. Alternatively, the programs may be transferred to a remote computer and be executed.

In this embodiment, the present invention has been described in the context of the conversion of SD image data into HD image data. However, the present invention can be applied to the case in which another type of data, for example, audio data, is converted into higher-quality audio data.

In the present invention, SD image data may be converted into HD image data having a larger number of pixels (number of samples), HD image data having improved spatial resolution, HD image data having improved temporal resolution (a larger number of frames or fields), or HD image data having improved level-direction resolution (a larger number of bits allocated to the pixel values). Alternatively, the present invention may be used for enlarging images.

In this embodiment, the image processing apparatus for converting an image and the learning device for learning a tap coefficient for each class used in the image processing apparatus are separately formed. However, the image processing apparatus and the learning device may be integrally formed. In this case, the learning device can perform learning in real time, and the tap coefficients used in the image processing apparatus can be updated in real time.

Although in this embodiment a tap coefficient for each class is prestored in the coefficient RAMs 5, 7, and 77, the tap coefficients may be supplied to the image processing apparatus together with, for example, an SD image.

In this embodiment, an HD pixel is determined by a linear equation. However, an HD image may be determined by a quadratic expression or an expression of a higher degree.

A class tap and a predictive tap may be formed by extracting SD pixels from SD image data of a plurality frames rather than one frame.

Blocks of HD image data may also be formed by HD pixels of HD image data of a plurality of frames rather than one frame.

The image processing apparatus shown in FIG. 2 or 12 can be applied to, for example, a television receiver for receiving television broadcast signals and displaying images, a DVD playback apparatus for playing back image data from DVD and outputting it, or a VTR for playing back image data from video tape and outputting it, or an apparatus for processing another type of image.

INDUSTRIAL APPLICABILITY

As described above, according to the present invention, data can be converted into higher-quality data.

The invention claimed is:

1. A data conversion apparatus for producing high definition image data by converting standard definition image data, inputted as first data, into high definition image data, outputted as second data, comprising:
    inputting means for inputting the first data;
    class-tap generating means for generating, from the first data, a class tap used for classifying a specified sample being a main sample or a sub sample of the second data into a class of at least one class;
    classification means for classifying the specified sample based on the class tap;
    predictive-tap generating means for generating, from the first data, a predictive tap for determining the specified sample;
    main tap-coefficient obtaining means for obtaining a main tap coefficient for the class of the specified sample from tap coefficients obtained by learning for each of said at least one class;
    sub tap-coefficient obtaining means for obtaining a sub tap coefficient for the class of the specified sample from tap coefficients obtained by learning a relationship between supervisor data corresponding to the second data, which serves as a learning supervisor, and learner data corresponding to the first data, which serves as a learner, for each of said at least one class by giving a predetermined constraint condition to the supervisor data;
    computation means for determining the specified sample by using the predictive tap and the main tap coefficient and the sub tap coefficient for the class of the specified sample; and
    outputting means for outputting the second data composed of samples computed by the computation means,
    wherein the main tap coefficient corresponds to the main sample and the sub tap coefficient corresponds to the sub sample, and
    wherein the predetermined constraint condition represents a difference between the main sample and the sub sample of the second data.

2. A data conversion apparatus according to claim 1, wherein:
    a difference tap coefficient is obtained by learning a relationship between the learner data and the difference of the main sample and the sub sample of the supervisor data; and
    the computation means determines a difference by using the predictive tap and the difference tap coefficient.

3. A data conversion apparatus according to claim 1, wherein:
    the sub tap coefficient is generated by adding a difference tap coefficient obtained by learning the relationship between the learner data and the difference between the main sample and the sub sample of the supervisor data to the main tap coefficient obtained by learning the relationship between the learner data and the main sample of the supervisor data; and
    said computation means determines the specified sample by using the main tap coefficient and the sub tap coefficient and the predictive tap.

4. A data conversion apparatus according to claim 1, wherein said computation means determines the specified sample by performing product-sum computation using the main tap coefficient and the sub tap coefficient and the predictive tap.

5. A data conversion apparatus according to claim 1, wherein the first data and the second data are image data.

6. A data conversion apparatus according to claim 1, wherein the second data is higher-quality data than the first data.

7. A data conversion method executed by a processor for producing high definition image data by converting standard definition image data, inputted as first data, into high definition image data, outputted as second data, comprising:
    an inputting step for inputting the first data;
    a class-tap generating step of generating, from the first data, a class tap used for classifying a specified sample being a main sample or a sub sample of the second data into a class of at least one class;
    a classification step of classifying the specified sample based on the class tap;
    a predictive-tap generating step of generating, from the first data, a predictive tap for determining the specified sample;
    a main tap-coefficient obtaining step for obtaining a main tap coefficient for the class of the specified sample from tap coefficients obtained by learning for each of said at least one class;

a sub tap-coefficient obtaining step of obtaining a sub tap coefficient for the class of the specified sample from tap coefficients obtained by learning a relationship between supervisor data corresponding to the second data, which serves as a learning supervisor, and learner data corresponding to the first data, which serves as a learner, for each of said at least one class by giving a predetermined constraint condition to the supervisor data;

a computation step of determining the specified sample by using the predictive tap and the main tap coefficient and the sub tap coefficient for the class of the specified sample; and an outputting step for outputting the second data composed of samples computed by the computation step, wherein the main tap coefficient corresponds to the main sample and the sub tap coefficient corresponds to the sub sample, and wherein the predetermined constraint condition represents a difference between the main sample and the sub sample of the second data.

8. A computer readable medium storing a program including program in instructions for, when executed by a processor, allowing a computer to execute data conversion processing for producing high definition image data by converting standard definition image data, inputted as first data, into high definition image data, outputted as second data, comprising:

an inputting step for inputting the first data;

a class-tap generating step of generating, from the first data, a class tap used for classifying a specified sample being a main sample or a sub sample of the second data into a class of at least one class;

a classification step of classifying the specified sample based on the class tap;

a predictive-tap generating step of generating, from the first data, a predictive tap for determining the specified sample;

a main tap-coefficient obtaining step for obtaining a main tap coefficient for the class of the specified sample from tap coefficients obtained by learning for each of said at least one class;

a sub tap-coefficient obtaining step of obtaining a sub tap coefficient for the class of the specified sample from tap coefficients obtained by learning a relationship between supervisor data corresponding to the second data, which serves as a learning supervisor, and learner data corresponding to the first data, which serves as a learner, for each of said at least one class by giving a predetermined constraint condition to the supervisor data;

a computation step of determining the specified sample by using the predictive tap and the main tap coefficient and the sub tap coefficient for the class of the specified sample; and an outputting step for outputting the second data composed of samples computed by the computation step, wherein the main tap coefficient corresponds to the main sample and the sub tap coefficient corresponds to the sub sample, and wherein the predetermined constraint condition represents a difference between the main sample and the sub sample of the second data.

9. A recording medium storing a program including program instructions for, when executed by a processor, allowing a computer to execute data conversion processing for producing high definition image data by converting standard definition image data, inputted as first data, into high definition image data, outputted as second data is recorded, said program comprising:

an inputting step for inputting the first data;

a class-tap generating step of generating, from the first data, a class tap used for classifying a specified sample being a main sample or a sub sample of the second data into a class of at least one class;

a classification step of classifying the specified sample based on the class tap;

a predictive-tap generating step of generating, from the first data, a predictive tap for determining the specified sample;

a main tap-coefficient obtaining step for obtaining a main tap coefficient for the class of the specified sample from tap coefficients obtained by learning for each of said at least one class;

a sub tap-coefficient obtaining step of obtaining a sub tap coefficient for the class of the specified sample from tap coefficients obtained by learning a relationship between supervisor data corresponding to the second data, which serves as a learning supervisor, and learner data corresponding to the first data, which serves as a learner, for each of said at least one class by giving a predetermined constraint condition to the supervisor data;

a computation step of determining the specified sample by using the predictive tap and the main tap coefficient and the sub tap coefficient for the class of the specified sample; and an outputting step for outputting the second data composed of samples computed by the computation step, wherein the main tap coefficient corresponds to the main sample and the sub tap coefficient corresponds to the sub sample, and wherein the predetermined constraint condition represents a difference between the main sample and the sub sample of the second data.

10. A learning device for performing learning for determining a predetermined tap coefficient used for producing high definition image data by converting standard definition image data, inputted as first data, into high definition image data, outputted as second data, comprising:

inputting means for inputting the first data;

class-tap generating means for generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

classification means for classifying the specified item of data based on the class tap;

predictive-tap generating means for generating a predictive tap used for determining the specified item of data from the learner data;

learning means for determining, by using the specified item of data and the predictive tap, the main tap-coefficient for the class of the specified item and for determining the sub tap coefficient for each of said at least one class by learning a relationship between the supervisor data and the learner data for each of said at least one class by giving a predetermined constraint condition to the supervisor data; and outputting means for outputting the second data composed of samples computed by the learning means, wherein the main tap coefficient corresponds to the main sample and the sub tap coefficient corresponds to the sub sample, and wherein the predetermined constraint condition represents a difference between the main sample and the sub sample of the second data.

11. A learning device according to claim 10, wherein said learning means determines a difference tap coefficient by learning the relationship between the learner data and the difference between the main sample and the sub sample of the supervisor data.

12. A learning device according to claim 10, wherein said learning means determines a difference tap coefficient by learning the relationship between the learner data and the difference between the main sample and the sub sample of the supervisor data, and also determines the main tap coefficient by learning the relationship between the learner data and the main sample of the supervisor data, and adds the difference tap coefficient to the main tap coefficient, thereby determining the sub tap coefficient.

13. A learning device according to claim 10, wherein said learning means determines the sub tap coefficient for converting the first data into the second data by performing product-sum computation of the first data and a sub tap coefficient.

14. A learning device according to claim 10, wherein the first data and the second data are image data.

15. A learning device according to claim 10, wherein the second data is higher-quality data than the first data.

16. A learning method executed by a processor for performing learning for determining a predetermined tap coefficient used for producing high definition image data by converting standard definition image data, inputted as first data, into high definition image data, outputted as second data, comprising:

inputting means for inputting the first data;

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

a classification step of classifying the specified item of data based on the class tap; a predictive-tap generating step of generating a predictive tap used for determining the specified item of data from the learner data;

a learning step of determining, by using the specified item of data and the predictive tap, the main tap-coefficient for the class of the specified item and for determining the sub tap coefficient for each of said at least one class by learning a relationship between the supervisor data and the learner data for each of said at least one class by giving a predetermined constraint condition to the supervisor data; and an outputting step for outputting the second data composed of samples computed by the learning step, wherein the main tap coefficient corresponds to the main sample and the sub tap coefficient corresponds to the sub sample, and wherein the predetermined constraint condition represents a difference between the main sample and the sub sample of the second data.

17. A computer readable medium storing a program including program instructions for, when executed by a processor, allowing a computer to execute learning processing for determining a predetermined tap coefficient used for producing high definition image data by converting standard definition image data, inputted as first data, into high definition image data, outputted as second data, comprising:

an inputting step for inputting the first data;

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

a classification step of classifying the specified item of data based on the class tap;

a predictive-tap generating step of generating a predictive tap used for determining the specified item of data from the learner data;

a learning step of determining, by using the specified item of data and the predictive tap, the main tap-coefficient for the class of the specified item and for determining the main tap coefficient for each of said at least one class by learning a relationship between the supervisor data and the learner data for each of said at least one class by giving a predetermined constraint condition to the supervisor data; and an outputting step for outputting the second data composed of samples computed by the learning step, wherein the main tap coefficient corresponds to the main sample and the sub tap coefficient corresponds to the sub sample, and wherein the predetermined constraint condition represents a difference between the main sample and the sub sample of the second data.

18. A recording medium storing a program including program instructions for, when executed by a processor, allowing a computer to execute learning processing for determining a predetermined tap coefficient used for producing high definition image data by converting standard definition image data, inputted as first data, into high definition image data, outputted as second data, said program comprising:

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

inputting the first data;

a classification step of classifying the specified item of data based on the class tap;

a predictive-tap generating step of generating a predictive tap used for determining the specified item of data from the learner data;

a learning step of determining, by using the specified item of data and the predictive tap, the main tap-coefficient for the class of the specified item and for determining the main tap coefficient for each of said at least one class by learning a relationship between the supervisor data and the learner data for each of said at least one class by giving a predetermined constraint condition to the supervisor data; and an outputting step for outputting the second data composed of samples computed by the learning step, wherein the main tap coefficient corresponds to the main sample and the sub tap coefficient corresponds to the sub sample, and wherein the predetermined constraint condition represents a difference between the main sample and the sub sample of the second data.

19. A data conversion apparatus for producing high definition image data by converting standard definition image data, inputted as first data, into high definition image data, outputted as second data, comprising:
- class-tap generating means for generating, from the first data, a class tap used for classifying a specified sample being a main sample or a sub sample of the second data into a class of at least one class;
- inputting means for inputting the first data;
- classification means for classifying the specified sample based on the class tap;
- predictive-tap generating means for generating, from the first data, a predictive tap for determining the specified sample;
- main tap-coefficient obtaining means for obtaining a main tap coefficient for the class of the specified sample from tap coefficients obtained by learning for each of said at least one class;
- sub tap-coefficient obtaining means for obtaining a sub tap coefficient for the class of the specified sample from tap coefficients obtained by learning a relationship between a feature obtained from a plurality of samples of supervisor data corresponding to the second data, which serves as a learning supervisor, and a plurality of samples of learner data corresponding to the first data, which serves as a learner, for each of said at least one class;
- computation means for determining the specified sample by using the predictive tap and the main tap coefficient and the sub tap coefficient for the class of the specified sample; and
- outputting means for outputting the second data composed of samples computed by the computation means,
- wherein the main tap coefficient corresponds to the main sample and the sub tap coefficient corresponds to the sub sample, and
- wherein the feature represents a difference between the main sample and the sub sample of the second data.

20. A data conversion apparatus according to claim 19, wherein:
- a difference tap coefficient is obtained by learning a relationship between the learner data and the difference of the main sample and the sub sample of the supervisor data; and
- the computation means determines a difference between the main sample and the sub sample by using the predictive tap and the difference tap coefficient.

21. A data conversion apparatus according to claim 19, wherein: the sub tap coefficient is generated by adding a difference tap coefficient obtained by learning a relationship between the plurality of samples of the learner data and the difference between the main sample and the sub sample of the supervisor data to the main tap coefficient; and
- said computation means determines the specified sample by using the main tap coefficient and the sub tap coefficient and the predictive tap.

22. A data conversion apparatus according to claim 19, wherein said computation means determines the specified sample by performing product-sum computation using the main tap coefficient and the sub tap coefficient and the predictive tap.

23. A data conversion apparatus according to claim 19, wherein the first data and the second data are image data.

24. A data conversion apparatus according to claim 19, wherein the second data is higher-quality data than the first data.

25. A data conversion method executed by a processor for producing high definition image data by converting standard definition image data, inputted as first data, into high definition image data, outputted as second data, comprising:
- a class-tap generating step of generating, from the first data, a class tap used for classifying a specified sample being a main sample or a sub sample of the second data into a class of at least one class;
- an inputting step for inputting the first data;
- a classification step of classifying the specified sample based on the class tap;
- a predictive-tap generating step of generating, from the first data, a predictive tap for determining the specified sample;
- a main tap-coefficient obtaining step for obtaining a main tap coefficient for the class of the specified sample from tap coefficients obtained by learning for each of said at least one class;
- a sub tap-coefficient obtaining step of obtaining a sub tap coefficient for the class of the specified sample from tap coefficients obtained by learning a relationship between a feature obtained from a plurality of samples of supervisor data corresponding to the second data, which serves as a learning supervisor, and a plurality of samples of learner data corresponding to the first data, which serves as a leaner, for each of said at least one class;
- a computation step of determining the specified sample by using the predictive tap and the main tap coefficient and the sub tap coefficient for the class of the specified sample; and
- an outputting step for outputting the second data composed of samples computed by the computation step,
- wherein the main tap coefficient corresponds to the main sample and the sub tap coefficient corresponds to the sub sample, and
- wherein the feature represents a difference between the main sample and the sub sample of the second data.

26. A computer readable medium storing a program including program instructions for, when executed by a processor, allowing a computer to execute data conversion processing for producing high definition image data by converting standard definition image data, inputted as first data, into high definition image data, outputted as second data, comprising:
- a class-tap generating step of generating, from the first data, a class tap used for classifying a specified sample being a main sample or a sub sample of the second data into a class of at least one class;
- an inputting step for inputting the first data;
- a classification step of classifying the specified sample based on the class tap;
- a predictive-tap generating step of generating, from the first data, a predictive tap for determining the specified sample;
- a main tap-coefficient obtaining step for obtaining a main tap coefficient for the class of the specified sample from tap coefficients obtained by learning for each of said at least one class;
- a sub tap-coefficient obtaining step of obtaining a sub tap coefficient for the class of the specified sample from tap coefficients obtained by learning a relationship between a feature obtained from a plurality of samples of supervisor data corresponding to the second data, which serves as a learning supervisor, and a plurality of samples of learner data corresponding to the first data, which serves as a learner, for each of said at least one class;

a computation step of determining the specified sample by using the predictive tap and the main tap coefficient and the sub tap coefficient for the class of the specified sample; and an outputting step for outputting the second data composed of samples computed by the computation step, wherein the main tap coefficient corresponds to the main sample and the sub tap coefficient corresponds to the sub sample, and wherein the feature represents a difference between the main sample and the sub sample of the second data.

27. A recording medium storing a program including program instructions for, when executed by a processor, allowing a computer to execute data conversion processing for producing high definition image data by converting standard definition image data, inputted as first data, into high definition image data, outputted as second data is recorded, said program comprising:

a class-tap generating step of generating, from the first data, a class tap used for classifying a specified sample being a main sample or a sub sample of the second data into a class of at least one class;

an inputting step for inputting the first data;

a classification step of classifying the specified sample based on the class tap;

a predictive-tap generating step of generating, from the first data, a predictive tap for determining the specified sample;

a main tap-coefficient obtaining step for obtaining a main tap coefficient for the class of the specified sample from tap coefficients obtained by learning for each of said at least one class;

a sub tap-coefficient obtaining step of obtaining a sub tap coefficient for the class of the specified sample from tap coefficients obtained by learning a relationship between a feature obtained from a plurality of samples of supervisor data corresponding to the second data, which serves as a learning supervisor, and a plurality of samples of learner data corresponding to the first data, which serves as a learner, for each of said at least one class;

a computation step of determining the specified sample by using the predictive tap and the main tap coefficient and the sub tap coefficient for the class of the specified sample; and an outputting step for outputting the second data composed of samples computed by the computation step, wherein the main tap coefficient corresponds to the main sample and the sub tap coefficient corresponds to the sub sample, and wherein the feature represents a difference between the main sample and the sub sample of the second data.

28. A learning device for performing learning for determining a predetermined tap coefficient used for producing high definition image data by converting standard definition image data, inputted as first data, into high definition image data, outputted as second data, comprising:

class-tap generating means for generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

inputting means for inputting the first data;

classification means for classifying the specified item of data based on the class tap;

predictive-tap generating means for generating a predictive tap used for determining the specified item of data from the learner data;

learning means for determining, by using the specified item of data and the predictive tap, the main tap-coefficient for the class of the specified item and for determining the sub tap coefficient for each of said at least one class by learning a relationship between a feature obtained from a plurality of samples of the supervisor data and a plurality of samples of the learner data for each of said at least one class;

an outputting means for outputting the second data composed of samples computed by the learning means, wherein the main tap coefficient corresponds to the main sample and the sub tap coefficient corresponds to the sub sample, and wherein the feature represents a difference between the main sample and the sub sample of the second data.

29. A learning device according to claim 28, wherein said learning means determines the sub tap coefficient by learning a relationship between the plurality of samples of the learner data and the difference between the main sample and the sub sample of the supervisor data.

30. A learning device according to claim 28, wherein said learning means determines a difference tap coefficient by learning the relationship between the plurality of samples of the learner data and the difference between the main sample and the sub sample of the supervisor data, and also determines the main tap coefficient by learning a relationship between the plurality of samples of the learner data and the main sample of the supervisor data, and adds the difference tap coefficient to the main tap coefficient, thereby determining the sub tap coefficient.

31. A learning device according to claim 28, wherein said learning means determines the sub tap coefficient for converting the first data into the second data by performing product-sum computation of the first data and the sub tap coefficient.

32. A learning device according to claim 28, wherein the first data and the second data are image data.

33. A learning device according to claim 28, wherein the second data is higher-quality data than the first data.

34. A learning method executed by a processor for performing learning for determining a predetermined tap coefficient used for producing high definition image data by converting standard definition image data, inputted as first data, into high definition image data, outputted as second data, comprising:

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

an inputting step for inputting the first data;

a classification step of classifying the specified item of data based on the class tap;

a predictive-tap generating step of generating a predictive tap used for determining the specified item of data from the learner data;

a learning step of determining, by using the specified item of data and the predictive tap, the main tap-coefficient for the class of the specified item and for determining the sub tap coefficient for each of said at least one class by learning a relationship between a feature obtained from a plurality of samples of the supervisor data and a plurality of samples of the learner data for each of said at least one class; and an outputting step for outputting the second data composed of samples computed by the learning step, wherein the main tap coefficient corresponds to the main sample and the sub tap coefficient corresponds to the sub sample, and wherein the feature represents a difference between the main sample and the sub sample of the second data.

35. A computer readable medium storing a program including program instructions for, when executed by a processor, allowing a computer to execute learning processing for determining a predetermined tap coefficient used for producing high definition image data by converting standard definition image data, inputted as first data, into high definition image data, outputted as second data, comprising:

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

an inputting step for inputting the first data;

a classification step of classifying the specified item of data based on the class tap;

a predictive-tap generating step of generating a predictive tap used for determining the specified item of data from the learner data;

a learning step of determining, by using the specified item of data and the predictive tap, the main tap-coefficient for the class of the specified item and for determining the sub tap coefficient for each of said at least one class by learning a relationship between a feature obtained from a plurality of samples of the supervisor data and a plurality of samples of the learner data for each of said at least one class; and an outputting step for outputting the second data composed of samples computed by the learning step, wherein the main tap coefficient corresponds to the main sample and the sub tap coefficient corresponds to the sub sample, and wherein the feature represents a difference between the main sample and the sub sample of the second data.

36. A recording medium storing a program including program instructions for, when executed by a processor, allowing a computer to execute learning processing for determining a predetermined tap coefficient used for producing high definition image data by converting standard definition image data, inputted as first data, into high definition image data, outputted as second data is recorded, said program comprising:

a class-tap generating step of generating a class tap used for classifying a specified item being a main sample or a sub sample of supervisor data corresponding to the second data, which serves as a supervisor for learning a main tap coefficient and a sub tap coefficient, into a class of at least one class, from learner data corresponding to the first data, which serves as a learner;

an inputting step for inputting the first data;

a classification step of classifying the specified item of data based on the class tap;

a predictive-tap generating step of generating a predictive tap used for determining the specified item of data from the learner data;

a learning step of determining, by using the specified item of data and the predictive tap, the main tap-coefficient for the class of the specified item and for determining the sub tap coefficient for each of said at least one class by learning a relationship between a feature obtained from a plurality of samples of the supervisor data and a plurality of samples of the learner data for each of said at least one class; and an outputting step for outputting the second data composed of samples computed by the learning step, wherein the main tap coefficient corresponds to the main sample and the sub tap coefficient corresponds to the sub sample, and wherein the feature represents a difference between the main sample and the sub sample of the second data.

* * * * *